(12) United States Patent
Cerny et al.

(10) Patent No.: US 11,748,840 B2
(45) Date of Patent: *Sep. 5, 2023

(54) METHOD FOR EFFICIENT RE-RENDERING OBJECTS TO VARY VIEWPORTS AND UNDER VARYING RENDERING AND RASTERIZATION PARAMETERS

(71) Applicant: Sony Interactive Entertainment LLC, San Mateo, CA (US)

(72) Inventors: Mark Evan Cerny, Los Angeles, CA (US); Jason Scanlin, Los Angeles, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,679

(22) Filed: Feb. 8, 2021

(65) Prior Publication Data
US 2021/0166338 A1  Jun. 3, 2021

Related U.S. Application Data

(60) Continuation of application No. 15/725,658, filed on Oct. 5, 2017, now Pat. No. 10,915,981, which is a
(Continued)

(51) Int. Cl.
*G06T 1/20* (2006.01)
*G06T 11/40* (2006.01)
(Continued)

(52) U.S. Cl.
CPC ............... *G06T 1/20* (2013.01); *G06F 3/013* (2013.01); *G06T 1/60* (2013.01); *G06T 11/20* (2013.01);
(Continued)

(58) Field of Classification Search
CPC ... G06F 3/013; G06T 1/20; G06T 1/60; G06T 11/40; G06T 15/10; G06T 11/20; G09G 5/14
See application file for complete search history.

(56) References Cited

U.S. PATENT DOCUMENTS 5,130,794 A  7/1992  Ritchey
5,224,208 A  6/1993  Miller et al.
(Continued)

FOREIGN PATENT DOCUMENTS

JP  2004265413 A  9/2004
JP  2008233765 A  10/2008
(Continued)

OTHER PUBLICATIONS

Raskar et al., Low-Cost Multi-Projector Curved Screen Displays, International Symposium Society for Information Displays (SID), TR2005-079, May 2005 (Year: 2005).*
(Continued)

*Primary Examiner* — Phuc N Doan
(74) *Attorney, Agent, or Firm* — JDI PATENT; Joshua Isenberg; Robert Pullman

(57) ABSTRACT

Graphics processing renders a scene with a plurality of different rendering parameters for different locations on a screen area. Each primitive of a batch of primitives belonging to an object covering at least two of the zones of the screen area is assembled to a screen space. Assembling each of the primitives includes iterating each primitive with a primitive assembler for each of the zones covered by the object. Each said zone is associated with a different set of screen space transform parameters used to transform locations of vertices in the batch of primitives from a homogenous coordinate space to a screen space that is not flat. The zones are arranged to minimize an overlap between zones.

31 Claims, 16 Drawing Sheets

Related U.S. Application Data division of application No. 14/678,445, filed on Apr. 3, 2015, now Pat. No. 10,438,312.

(60) Provisional application No. 61/975,774, filed on Apr. 5, 2014.

(51) Int. Cl.
*G06T 15/10* (2011.01)
*G09G 5/14* (2006.01)
*G06F 3/01* (2006.01)
*G06T 1/60* (2006.01)
*G06T 11/20* (2006.01)

(52) U.S. Cl.
CPC .............. *G06T 11/40* (2013.01); *G06T 15/10* (2013.01); *G09G 5/14* (2013.01)

(56) References Cited

U.S. PATENT DOCUMENTS

| | | |
|---|---|---|
| 5,422,653 A | 6/1995 | Maguire |
| 5,602,391 A | 2/1997 | Pines et al. |
| H1812 H | 11/1999 | Arcuri |
| 6,249,289 B1 | 6/2001 | Arnaud et al. |
| 6,313,838 B1 | 11/2001 | Deering |
| 6,469,700 B1 | 10/2002 | Munshi et al. |
| 6,724,403 B1 | 4/2004 | Santoro et al. |
| 6,804,066 B1 | 10/2004 | Ha et al. |
| 6,967,663 B1 | 11/2005 | Bastos et al. |
| 7,161,603 B2 | 1/2007 | Saito et al. |
| 7,336,277 B1 | 2/2008 | Clark et al. |
| 7,339,594 B1 | 3/2008 | Newhall et al. |
| 7,426,724 B2 | 9/2008 | Kilgard et al. |
| 7,511,717 B1 | 3/2009 | Bastos et al. |
| 7,907,792 B2 | 3/2011 | Harville |
| 7,916,155 B1 | 3/2011 | Moreton |
| 8,090,383 B1 | 1/2012 | Emigh et al. |
| 8,144,156 B1 | 3/2012 | Baldwin |
| 8,233,004 B1 | 7/2012 | Molnar et al. |
| 8,300,059 B2 | 10/2012 | Isidoro et al. |
| 8,581,929 B1 | 11/2013 | Maguire |
| 8,669,999 B2 | 3/2014 | Donovan et al. |
| 9,495,790 B2 | 11/2016 | Cerny |
| 9,652,882 B2 | 5/2017 | Cerny |
| 9,710,881 B2 | 7/2017 | Cerny |
| 9,710,957 B2 | 7/2017 | Berghoff |
| 10,438,312 B2 | 10/2019 | Cerny |
| 2003/0086603 A1 | 5/2003 | Davidson et al. |
| 2003/0122833 A1 | 7/2003 | Doyle |
| 2003/0234784 A1 | 12/2003 | Grzeszczuk et al. |
| 2004/0036692 A1 | 2/2004 | Alcorn et al. |
| 2004/0169663 A1* | 9/2004 | Bernier .................. G06T 15/04 345/629 |
| 2004/0184013 A1* | 9/2004 | Raskar ................ H04N 9/3147 353/121 |
| 2004/0227699 A1 | 11/2004 | Mitchell |
| 2004/0263520 A1* | 12/2004 | Wasserman ............ H04N 19/80 345/506 |
| 2005/0225670 A1 | 10/2005 | Wexler et al. |
| 2006/0256112 A1 | 11/2006 | Heirich et al. |
| 2006/0277520 A1 | 12/2006 | Gennari |
| 2007/0018988 A1 | 1/2007 | Guthe |
| 2007/0083821 A1 | 4/2007 | Garbow et al. |
| 2007/0146378 A1 | 6/2007 | Sorgard et al. |
| 2007/0165035 A1 | 7/2007 | Duluk et al. |
| 2007/0183649 A1 | 8/2007 | Kiefer et al. |
| 2008/0007559 A1 | 1/2008 | Kalaiah et al. |
| 2008/0062164 A1 | 3/2008 | Bassi et al. |
| 2008/0106489 A1 | 5/2008 | Brown et al. |
| 2008/0113792 A1 | 5/2008 | Yamada et al. |
| 2008/0129748 A1 | 6/2008 | Bakalash et al. |
| 2009/0033659 A1 | 2/2009 | Lake et al. |
| 2009/0141033 A1 | 6/2009 | Street |
| 2010/0002000 A1 | 1/2010 | Everitt et al. |
| 2010/0007662 A1 | 1/2010 | Cox et al. |
| 2010/0020069 A1 | 1/2010 | Elmieh et al. |
| 2010/0056274 A1 | 3/2010 | Uusitalo et al. |
| 2010/0104162 A1 | 4/2010 | Falk et al. |
| 2010/0156919 A1 | 6/2010 | Bala et al. |
| 2010/0214294 A1 | 8/2010 | Li et al. |
| 2010/0318467 A1* | 12/2010 | Porter .................. H04N 5/2624 348/207.1 |
| 2011/0090242 A1 | 4/2011 | Frederiksen |
| 2011/0134136 A1 | 6/2011 | Seiler |
| 2011/0188744 A1 | 8/2011 | Sun |
| 2011/0216069 A1 | 9/2011 | Keall et al. |
| 2012/0069021 A1 | 3/2012 | Son et al. |
| 2012/0092366 A1 | 4/2012 | Smithers et al. |
| 2012/0098937 A1* | 4/2012 | Sajadi .................... G03B 21/14 348/46 |
| 2012/0146891 A1 | 6/2012 | Kalinli |
| 2012/0206452 A1 | 8/2012 | Geisner et al. |
| 2012/0293486 A1 | 11/2012 | Adachi |
| 2012/0293519 A1 | 11/2012 | Ribble et al. |
| 2012/0320069 A1 | 12/2012 | Lee et al. |
| 2013/0021358 A1 | 1/2013 | Nordlund et al. |
| 2013/0042206 A1 | 2/2013 | Zaman et al. |
| 2013/0063440 A1 | 3/2013 | Son et al. |
| 2013/0063442 A1 | 3/2013 | Zaman et al. |
| 2013/0093766 A1 | 4/2013 | Hutchins et al. |
| 2013/0114680 A1 | 5/2013 | Leontaris et al. |
| 2013/0120380 A1 | 5/2013 | Kallio et al. |
| 2013/0265309 A1 | 10/2013 | Goel et al. |
| 2013/0300740 A1 | 11/2013 | Snyder et al. |
| 2013/0342547 A1 | 12/2013 | Lum et al. |
| 2014/0015838 A1 | 1/2014 | Yoo et al. |
| 2014/0049549 A1 | 2/2014 | Lukyanov et al. |
| 2014/0063016 A1 | 3/2014 | Howson et al. |
| 2015/0287158 A1 | 10/2015 | Cerny et al. |
| 2015/0287165 A1 | 10/2015 | Berghoff |
| 2015/0287167 A1 | 10/2015 | Cerny |
| 2015/0287231 A1 | 10/2015 | Berghoff |
| 2016/0088287 A1* | 3/2016 | Sadi ...................... H04N 13/194 348/43 |
| 2016/0261831 A1* | 9/2016 | Coleman .............. H04N 9/3147 |
| 2017/0243390 A1 | 8/2017 | Cerny |
| 2018/0047129 A1 | 2/2018 | Cerny |

FOREIGN PATENT DOCUMENTS

| | | |
|---|---|---|
| KR | 20110036947 A | 4/2011 |
| TW | I250785 B | 3/2006 |
| TW | 200919376 A | 5/2009 |
| TW | 201001329 A | 1/2010 |
| TW | 201143466 A | 12/2011 |

OTHER PUBLICATIONS

Van Baar et al., Seamless Multi-Projector Display on Curved Screens, IPT/EGVE 2003, TR2003-26 (Year: 2003).*

Bloomenthal et al., Homogeneous Coordinates, the University of Calgary, 1993, URL: http://dx.doi.org/10.11575/PRISM/30973, pp. 27 (Year: 1993).*

Extended European Search Report Application No. 15773509.3, dated Month Day, Year.

Extended European search report dated Aug. 29, 2017 for European Patent Application No. 15773477.3.

Final Office Action for U.S. Appl. No. 14/678,445, dated Feb. 8, 2019.

Final Office Action for U.S. Appl. No. 15/725,658, dated Jul. 11, 2019.

Final Office Action for U.S. Appl. No. 15/725,658, dated Jun. 15, 2020.

Final Office Action for U.S. Appl. No. 14/246,061, dated Jun. 17, 2016.

Final Office Action for U.S. Appl. No. 14/246,062, dated Jul. 15, 2016.

Final Office Action for U.S. Appl. No. 14/246,063, dated Jun. 21, 2016.

(56) References Cited

OTHER PUBLICATIONS

Final Office Action for U.S. Appl. No. 14/246,064, dated Jul. 11, 2016.
Final Office Action for U.S. Appl. No. 14/246,066, dated Jul. 20, 2016.
Final Office Action for U.S. Appl. No. 14/246,067, dated Jun. 17, 2016.
Final Office Action for U.S. Appl. No. 14/678,445, dated Jul. 7, 2017.
International Search Report and Written Opinion for International Application No. PCT/US2015/024303, dated Jul. 1, 2015.
International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
John D. Owens, Mike Houston, David Luebke, Simon Green, John E. Stone, and James C. Phillips, "GPU Computing", Proceeding of IEEE, May 2008, p. 879-899.
Matthaus G. Chajdas, Morgan McGuire, David Luebke; "Subpixel Reconstruction Antialiasing for Deferred Shading" in i3D, Feb. 2011.
Non-Final Action for U.S. Appl. No. 15/725,658, dated Jan. 14, 2019.
Non-Final Office Action for U.S. Appl. No. 14/678,445, dated Oct. 5, 2018.
Non-Final Office Action for U.S. Appl. No. 15/725,658, dated Jan. 9, 2020.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,064, dated Feb. 1, 2015.
Non-Final Office Action for U.S. Appl. No. 14/246,066, dated Dec. 30, 2016.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,067, dated Oct. 27, 2016.
Non-Final Office Action for U.S. Appl. No. 14/246,068, dated Jan. 14, 2016.
Non-Final Office Action for U.S. Appl. No. 14/678,445, dated Dec. 30, 2016.
Non-Final Office Action for US Application No. 141246,061, dated Oct. 20, 2016.
Non-Final/Final Office Action for U.S. Appl. No. 14/678,445, dated Jun. 20, 2018.
Notice of Allowance dated May 17, 2019 for U.S. Appl. No. 14/678,445.
Notice of Allowance for U.S. Appl. No. 15/725,658, dated Oct. 8, 2020.
Notice of Allowance for U.S. Appl. No. 14/246,062, dated Jan. 4, 2017.
Notice of Allowance for U.S. Appl. No. 14/246,068, dated Jul. 15, 2016.
Notification of Reason(s) for Refusal dated Sep. 12, 2017 for Japanese Patent application No. 2016-559961.
Notification of Reasons for Refusal dated Feb. 13, 2018 for Japanese Patent Application No. 2016-560563.
Office Action dated May 16, 2018 for Korean patent application No. 2016-7027205.
Official Letter dated Feb. 19, 2020 in European Patent Application No. 15773509.3.
Taiwan Office Action for TW Application No. 104108777, dated Jun. 27, 2016.
Taiwanese Office Action for TW Application No. 104108773, dated Dec. 22, 2015.
Taiwanese Office Action for TW Application No. 104108774, dated Sep. 12, 2016.
U.S. Appl. No. 14/246,061, to Tobias Berghoff, filed Apr. 5, 2014.
U.S. Appl. No. 14/246,062, to Mark Evan Cerny, filed Apr. 5, 2014.
U.S. Appl. No. 14/246,063, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 61/975,774, to Mark Evan Cerny, filed Apr. 5, 2014.
U.S. Appl. No. 15/652,134 to Mark Evan Cerny, filed Jul. 17, 2017.
U.S. Appl. No. 15/653,422 to Tobias Berghoff, filed Jul. 18, 2017.
U.S. Appl. No. 15/717,041 to Mark Evan Cerny, filed Sep. 27, 2017.
U.S. Appl. No. 15/725,658 to Mark Evan Cerny, filed Oct. 5, 2017.
Extended European Search Report Application No. 21167531.9, dated Jul. 12, 2021.

\* cited by examiner 114 degree FOV 90 degree FOV

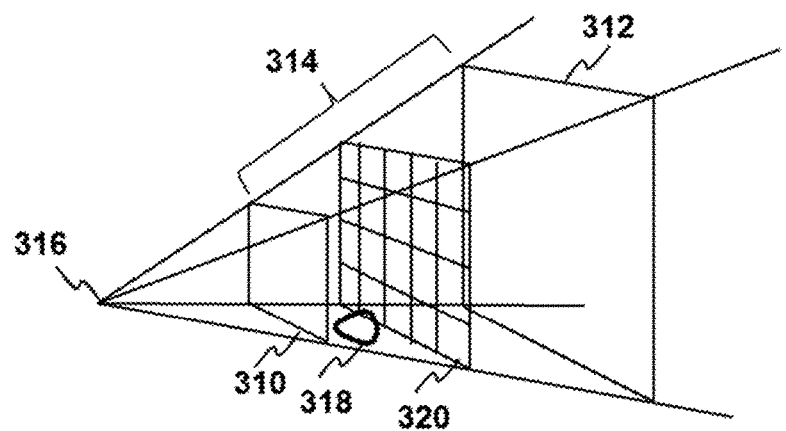
FIG. 3A
(Conventional)
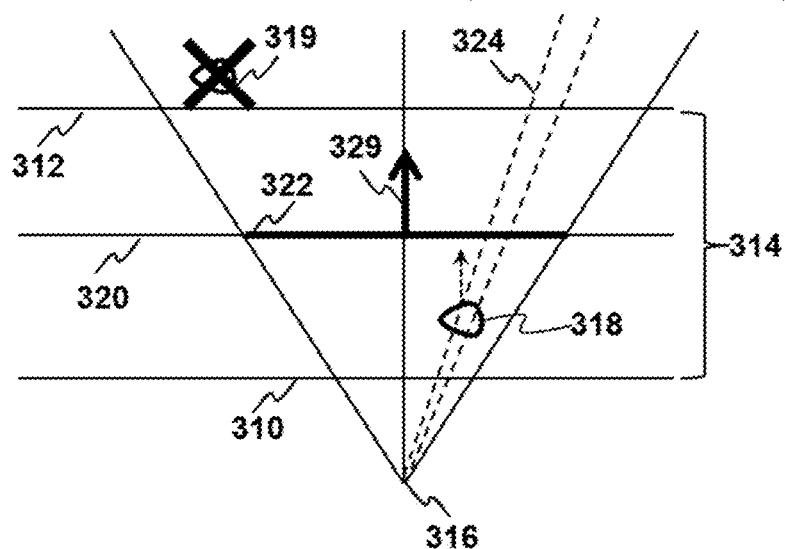
FIG. 3B
(Conventional)
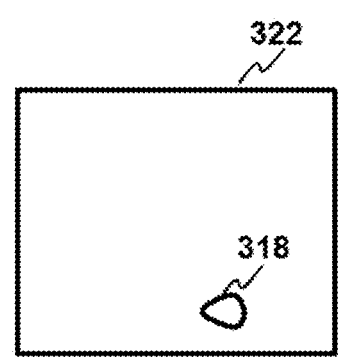
FIG. 3C
(Conventional)

FIG. 7A  FIG. 7B

METHOD FOR EFFICIENT RE-RENDERING OBJECTS TO VARY VIEWPORTS AND UNDER VARYING RENDERING AND RASTERIZATION PARAMETERS

CLAIM OF PRIORITY

This Application is a continuation of U.S. application Ser. No. 15/725,658 filed Oct. 5, 2017, the entire contents of which are incorporated herein by reference. U.S. application Ser. No. 15/725,658 is a divisional of U.S. application Ser. No. 14/678,445 filed Apr. 3, 2015, the entire contents of which are incorporated herein by reference. U.S. application Ser. No. 14/678,445 claims the priority benefit of commonly-assigned U.S. provisional patent application No. 61/975,774, filed Apr. 5, 2014, the entire contents of which are incorporated herein by reference.

CROSS-REFERENCE TO RELATED APPLICATIONS

This application is related to commonly-assigned, co-pending U.S. patent application Ser. No. 14/246,064, to Tobias Berghoff, entitled "METHOD FOR EFFICIENT CONSTRUCTION OF HIGH RESOLUTION DISPLAY BUFFERS", filed Apr. 5, 2014 and published as U.S. Patent Application Publication number 2015/0287231, the entire contents of which are herein incorporated by reference.

This application is related to commonly-assigned, co-pending U.S. patent application Ser. No. 14/246,067, to Tobias Berghoff, entitled "GRAPHICS PROCESSING ENHANCEMENT BY TRACKING OBJECT AND/OR PRIMITIVE IDENTIFIERS", filed Apr. 5, 2014 and granted as U.S. Pat. No. 9,710,957 issued Jul. 17, 2017, the entire contents of which are herein incorporated by reference.

This application is related to commonly-assigned, co-pending U.S. patent application Ser. No. 14/246,068, to Mark Evan Cerny, entitled "GRADIENT ADJUSTMENT FOR TEXTURE MAPPING TO NON-ORTHONORMAL GRID", filed Apr. 5, 2014 and granted as U.S. Pat. No. 9,495,790 issued Nov. 16, 2016, the entire contents of which are herein incorporated by reference.

This application is related to commonly-assigned, co-pending U.S. patent application Ser. No. 14/246,061, to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed Apr. 5, 2014 and published as U.S. Patent Application Publication number 2015/0287165, the entire contents of which are herein incorporated by reference, the entire contents of which are herein incorporated by reference.

This application is related to commonly-assigned, co-pending U.S. patent application Ser. No. 14/246,063, to Mark Evan Cerny, entitled "VARYING EFFECTIVE RESOLUTION BY SCREEN LOCATION BY ALTERING RASTERIZATION PARAMETERS", filed Apr. 5, 20142014 and granted as U.S. Pat. No. 9,710,881 issued Jul. 18, 2017, the entire contents of which are herein incorporated by reference.

This application is related to commonly-assigned, co-pending U.S. patent application Ser. No. 14/246,066, to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed Apr. 5, 2014 and published as U.S. Patent Application Publication number 2015/0287167, the entire contents of which are herein incorporated by reference.

This application is related to commonly-assigned, co-pending U.S. patent application Ser. No. 14/246,062 to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed Apr. 5, 2014 and granted as U.S. Pat. No. 9,652,882 issued May 16, 2017, the entire contents of which are herein incorporated by reference.

FIELD

The present disclosure relates to computer graphics processing. Certain aspects of the present disclosure especially relate to graphics rendering for head mounted displays (HMDs), foveated rendering, and other non-traditional rendering environments.

BACKGROUND

Computer graphics processing is an intricate process used to create images that depict virtual content for presentation on a display. Modern 3D graphics are often processed using highly capable graphics processing units (GPU) having specialized architectures designed to be efficient at manipulating computer graphics. The GPU is a specialized electronic circuit designed to accelerate the creation of images in a frame buffer intended for output to a display, and GPUs often have a highly parallel processing architecture that makes the GPU more effective than a general-purpose CPU for algorithms where processing of large blocks of data is done in parallel. GPUs are used in a variety of computing systems, such as embedded systems, mobile phones, personal computers, tablet computers, portable game devices, workstations, and game consoles.

Many modern computer graphics processes for video games and other real-time applications utilize a rendering pipeline that includes many different stages to perform operations on input data that determine the final array of pixel values that will be presented on the display. In some implementations of a graphics rendering pipeline, processing may be coordinated between a CPU and a GPU. Input data may be setup and drawing commands may be issued by the central processing unit (CPU) based on the current state of an application (e.g., a video game run by the CPU) through a series of draw calls issued to the GPU through an application interface (API), which may occur many times per graphics frame, and the GPU may implement various stages of the pipeline in response in order to render the images accordingly.

Most stages of the pipeline have well defined inputs and outputs as data flows through the various processing stages, and any particular implementation may include or omit various stages depending on the desired visual effects. Sometimes various fixed function operations within the graphics pipeline are implemented as hardware modules within the GPU, while programmable shaders typically perform the majority of shading computations that determine color, lighting, texture coordinates, and other visual values associated with the objects and pixels in the image, although it is possible to implement various stages of the pipeline in hardware, software, or a combination thereof. Older GPUs used a predominantly fixed function pipeline with computations fixed into individual hardware modules of the GPUs, but the emergence of shaders and an increasingly programmable pipeline have caused more operations to be implemented by software programs, providing developers with more flexibility and greater control over the rendering process.

Generally speaking, early stages in the pipeline include computations that are performed on geometry in virtual space (sometimes referred to herein as "world space"), which may be a representation of a two-dimensional or, far more commonly, a three-dimensional virtual world. The objects in the virtual space are typically represented as a polygon mesh set up as input to the early stages of the pipeline, and whose vertices correspond to the set of primitives in the image, which are typically triangles but may also include points, lines, and other polygonal shapes. Often, the process is coordinated between a general purpose CPU which runs the application content, sets up input data in one or more buffers for the GPU, and issues draw calls to the GPU through an application interface (API) to render the graphics according to the application state and produce the final frame image.

The vertices of each primitive may be defined by a set of parameter values, including position values (e.g., X-Y coordinate and Z-depth values), color values, lighting values, texture coordinates, and the like, and the graphics may be processed in the early stages through manipulation of the parameter values of the vertices on a per-vertex basis. Operations in the early stages may include vertex shading computations to manipulate the parameters of the vertices in virtual space, as well as optionally tessellation to subdivide scene geometries and geometry shading computations to generate new scene geometries beyond those initially set up in the application stage. Some of these operations may be performed by programmable shaders, including vertex shaders which manipulate the parameter values of the vertices of the primitive on a per-vertex basis in order to perform rendering computations in the underlying virtual space geometry.

To generate images of the virtual world suitable for a display, the objects in the scene and their corresponding primitives are converted from virtual space to screen space through various processing tasks associated with rasterization. Intermediate stages include primitive assembly operations that may include various transformation operations to determine the mapping and projection of primitives to a rectangular viewing window (or "viewport") at a two dimensional plane defining the screen space (where stereoscopic rendering is used, it is possible the geometry may be transformed to two distinct viewports corresponding to left and right eye images for a stereoscopic display). Primitive assembly often includes clipping operations for primitives/objects falling outside of a viewing frustum, and distant scene elements may be clipped during this stage to preserve rendering resources for objects within a range of distances for which detail is more important (e.g., a far clipping plane). Homogeneous coordinates are typically used so that the transformation operations which project the scene geometry onto the screen space plane are easier to compute using matrix calculations. Certain primitives, e.g., back-facing triangles, may also be culled as an optimization to avoiding processing fragments that would result in unnecessary per-pixel computations for primitives that are occluded or otherwise invisible in the final image.

Scan conversion is typically used to sample the primitives assembled to the viewport at discrete pixels in screen space, as well as generate fragments for the primitives that are covered by the samples of the rasterizer. The parameter values used as input values for each fragment are typically determined by interpolating the parameters of the vertices of the sampled primitive that created the fragment to a location of the fragment's corresponding pixel in screen space, which is typically the center of the pixel or a different sample location within the pixel, although other interpolation locations may be used in certain situations.

The pipeline may then pass the fragments and their interpolated input parameter values down the pipeline for further processing. During these later pixel processing stages, per-fragment operations may be performed by invoking a pixel shader (sometimes known as a "fragment shader") to further manipulate the input interpolated parameter values, e.g., color values, depth values, lighting, texture coordinates, and the like for each of the fragments, on a per-pixel or per-sample basis. Each fragment's coordinates in screen space correspond to the pixel coordinates and/or sample coordinates defined in the rasterization that generated them. In video games and other instances of real-time graphics processing, reducing computational requirements and improving computational efficiency for rendering tasks is a critical objective for achieving improved quality and detail in rendered graphics.

Each stage in conventional graphics rendering pipelines is typically configured to render graphics for traditional display devices, such as television screens and flat panel display monitors. Recently, an interest has arisen for less traditional display devices, such as head mounted displays (HMDs), and less traditional rendering techniques, such as foveated rendering. These non-traditional display technologies present unique opportunities for optimizing efficiency in graphics rendering pipelines.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIGS. 3A-3C are schematic diagrams depicting conventional rendering parameters.

FIGS. 7A-7C are schematic diagrams depicting viewports having a plurality of zones and associated objects covered by different zones of the viewports in accordance with aspects of the present disclosure.

DETAILED DESCRIPTION

Figure 1A:
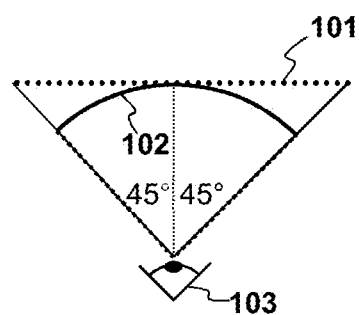
FIG. 1A and FIG. 1B are simplified diagrams illustrating certain parameters of wide field of view (FOV) displays.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure relate to graphics rendering techniques designed to improve rendering efficiency in a graphics pipeline by dividing screen space into a plurality of distinct zones (e.g., two or more zones), and performing certain processing operations differently in the different zones. Each different zone in screen space may correspond to one or more pixels in the final image, and each different zone may be rendered with different rendering parameters in the rendering pipeline as an optimization to improve rendering efficiency. For example, one or more of the zones may be determined to be of lesser relative importance in terms of image quality for the viewer, and one or more of its rendering parameters may be different from another zone deemed to be more important as a result, in order to preserve graphics processing resources for the zone deemed to be more important.

According to an additional aspect of the present disclosure, this may be useful when rendering graphics for a head mounted display (HMD) by exploiting the fact that the solid angle subtended by each pixel (or set of pixels) that is proximate edges of the screen and corners of the screen may be smaller than the solid angle subtended by pixels/sets of pixels at the center of the screen. For example, the rendering parameters may be selected to preserve rendering resources for one or more zones corresponding to center pixels in screen space, and the parameters of zones at the edges and/or corners of screen space may be selected for efficiency.

According to yet another aspect of the present disclosure, this may be useful where foveated rendering is used, and the locations of the different zones may be based on a determined fixation point of the viewer. In certain implementations, it may thus be useful for the location of one or more of the screen zones to be dynamic and change over time, e.g., in response to detected changes of a fixation point of an eye (or pair of eyes) as detected by an eye gaze tracking system.

According to a further aspect of the present disclosure, foveated imaging may be combined with a head mounted display, in which case a head mounted display device may be configured to include an eye gaze tracking system, such as one that includes one or more light sources and one or more cameras.

According to an additional aspect of the present disclosure, an object may be re-rendered when it overlaps a plurality of different zones, and it may be re-rendered for each zone that it overlaps. In certain implementations, this may be accomplished via a command buffer that sets up a rendering parameter context for each zone, and a zone index associated with each context. The zone index or indices may be set up for an object for each zone that the object overlaps. In other implementations, when an object overlaps a plurality of zones in screen space, each of the primitives of the object may be assembled uniquely by a primitive assembler for each zone that the object overlaps.

Figure 1B:
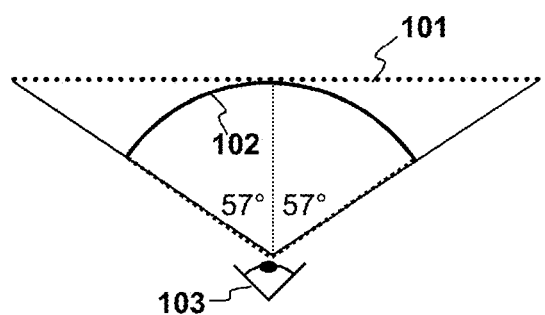
Figure 1C:
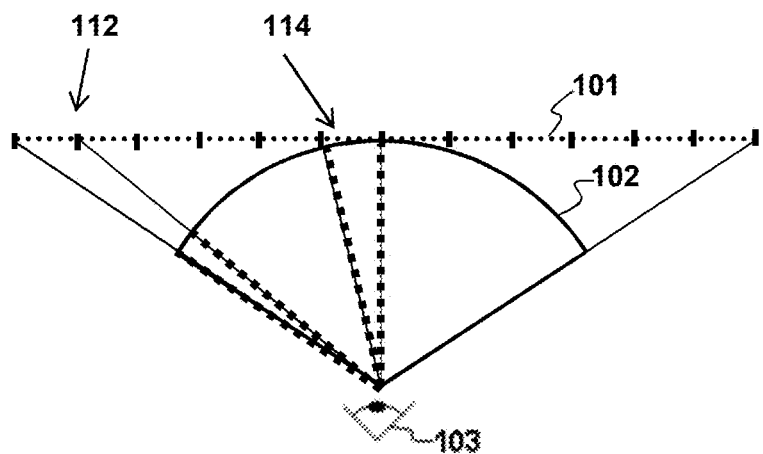
FIG. 1C illustrates different solid angles for different portions of a wide FOV display.

FIGS. 1A-1C illustrate a previously unappreciated problem with large FOV displays. FIG. 1A illustrates a 90 degree FOV display and FIG. 1B illustrates a 114 degree FOV display. In a conventional large FOV display, three dimensional geometry is rendered using a planar projection to the view plane 101. However, it turns out that rendering geometry onto a high FOV view plane is very inefficient. As may be seen in FIG. 1C, edge regions 112 and central regions 114 of view plane 101 are the same area but represent very different solid angles, as seen by a viewer 103. Consequently, pixels near the edge of the screen hold much less meaningful information than pixels near the center. When rendering the scene conventionally, these regions have the same number of pixels and the time spent rendering equal sized regions on the screen is approximately the same.

Figure 2A:
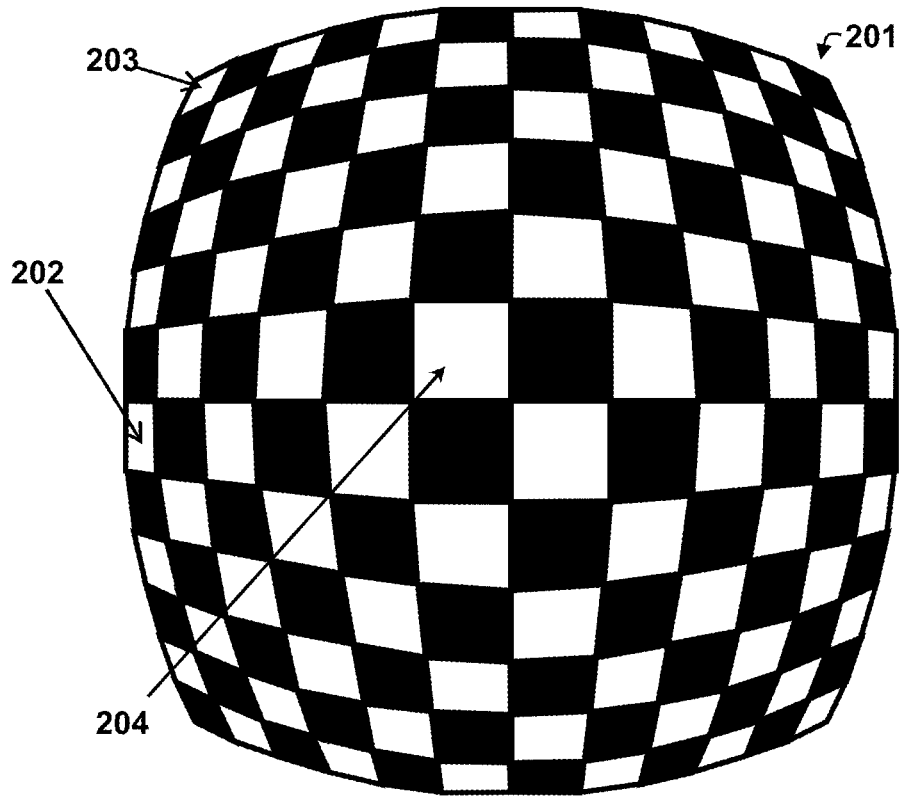
FIGS. 2A-2C illustrate examples of the relative importance of pixels in different regions of different wide FOV displays in accordance with aspects of the present disclosure.
Figure 2B:
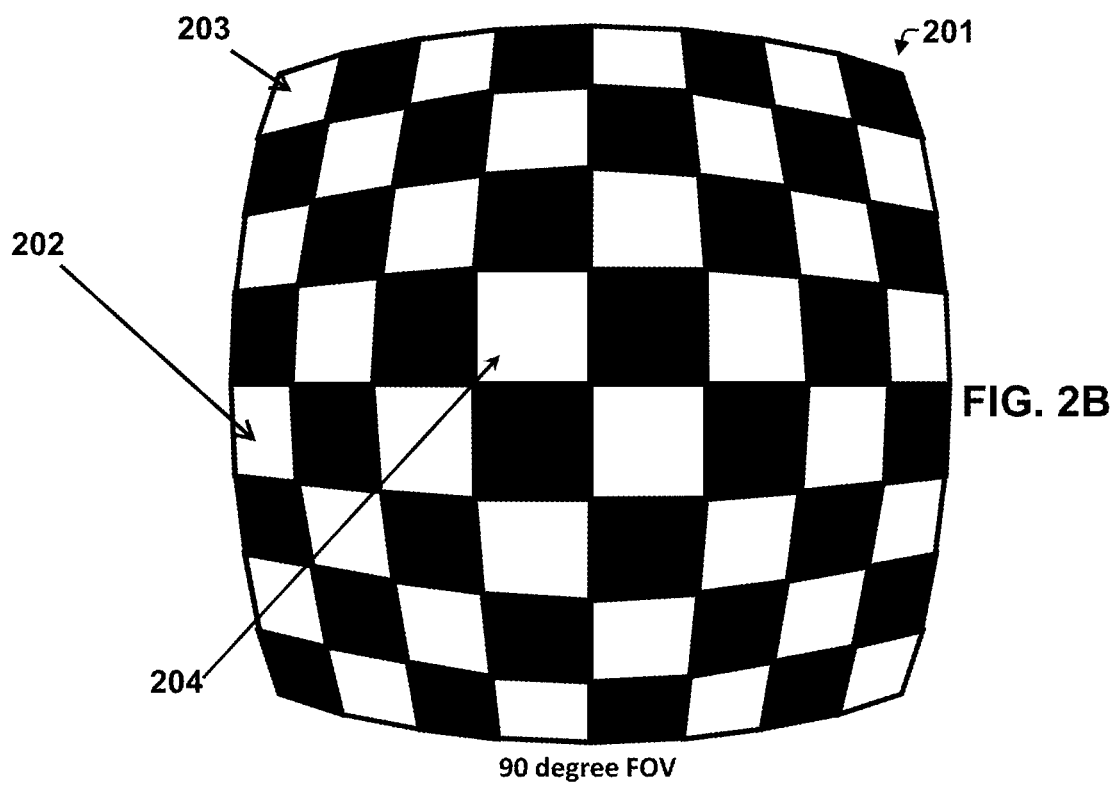
Figure 2C:
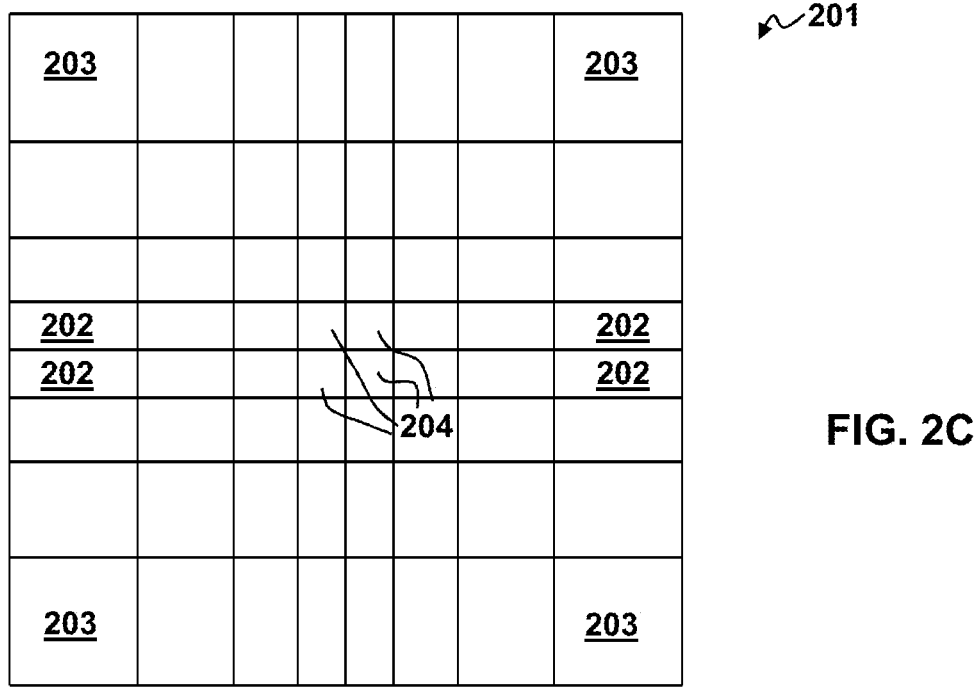

FIGS. 2A-2C illustrate the relative importance of different portions of a large FOV display in two dimensions for different sized fields of view. FIG. 2A expresses the variance in solid angle for each square of a planar checkerboard perpendicular to the direction of view, in the case that the checkerboard subtends an angle of 114 degrees. In other words, it expresses the inefficiency of conventional planar projective rendering to a 114 degree FOV display. FIG. 2B expresses the same information for a 90 degree FOV display. In such planar projective rendering, the projection compresses tiles 202 in the image 201 that are at the edges and tiles 203 at the corners into smaller solid angles compared to tiles 204 at the center. Because of this compression, and the fact that each tile in the image 201 has the same number of pixels in screen space, there is an inefficiency factor of roughly 4× for rendering the edge tiles 202 compared to the center tiles 204. By this it is meant that conventional rendering of the edge tiles 202 involves 4 times as much processing per unit solid angle than for the center tiles 204. For the corner tiles 203, the inefficiency factor is roughly 8×. When averaged over the whole image 201, the inefficiency factor is roughly 2.5×.

The inefficiency is dependent on the size of the FOV. For example, for the 90 degree FOV display shown in FIG. 2B, the inefficiency factors are roughly 2× for rendering the edge tiles 202, roughly 3× for rendering the corner tiles 203, and roughly 1.7× overall for rendering the image 201.

Another way of looking at this situation is shown in FIG. 2C, in which the screen 102 has been divided into rectangles of approximately equal "importance" in terms of pixels per unit solid angle subtended. Each rectangle makes roughly the same contribution to the final image as seen through the display. One can see how the planar projection distorts the importance of edge rectangles 202 and corner rectangles 203. In addition to the factors relating to solid angle, the corner rectangles 203 might make still less of a contribution than the center rectangles due to the display optics, which may choose to make the visual density of pixels (as expressed as pixels per solid angle) higher towards the center of the display.

Figure 2D:
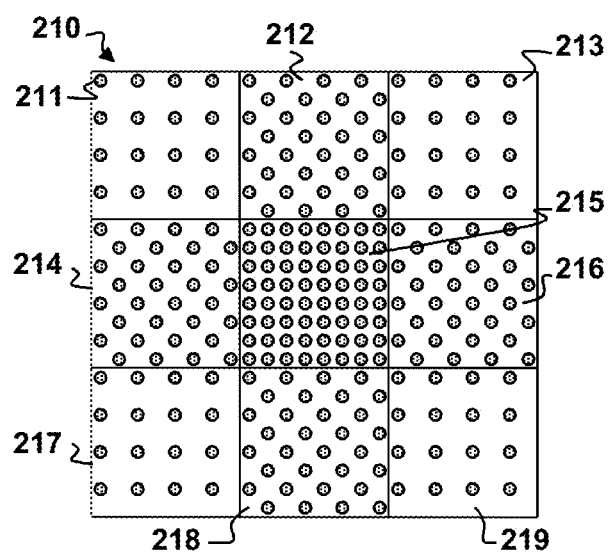
FIG. 2D illustrates an example of different pixel resolution for different regions of a screen of a FOV display in accordance with aspects of the present disclosure.

Based on the foregoing observations, it would be advantageous for an image 210 for a wide FOV display to have pixel densities that are smaller at edge regions 212, 214, 216, 218 than at center regions 215 and smaller at corner regions 211, 213, 217 and 219 than at the edge regions 212, 214, 216, 218 as shown in FIG. 2D. It would also be advantageous to render a conventional graphical image on the screen of a wide FOV display in a way that gets the same effect as varying the pixel densities across the screen without having to significantly modify the underlying graphical image data or data format or the processing of the data.

If foveated rendering were used, the center 204 in FIG. 2C in terms of a determined importance of pixels may be understood to correspond to a determined fixation point of the viewer, and it would also be advantageous to preserve rendering resources for the fixation point.

Turning now to FIGS. 3A-3C, an illustrative example of a viewing frustum for computer graphics rendering is depicted according to conventional principles. FIG. 3A depicts a perspective view of the frustum, while FIG. 3B depicts the same frustum of FIG. 3B in plan view. FIG. 3C depicts the corresponding screen space that results.

As shown in FIGS. 3A-3B, the frustum may be understood to be a truncated pyramid defined by a center of projection 316. The center of projection 316 may be understood to correspond to an eye or virtual camera defining the viewpoint from which the scene is viewed. The frustum includes a near clipping plane 310 and a far clipping plane 312 which defines a view volume for the graphics to be rendered, i.e., the volume within the frustum defines the view volume. Although not separately labeled in the figure, the view frustum planes defined by the left, right, top, and bottom faces of the frustum may be understood to be discard planes, beyond which a rendered object would be off-screen and could therefore be discarded. Not depicted here in this figure are the left, right, top, and bottom clip planes, which are typically configured with a much wider field of view in order to implement a clipping guard band to minimize the need to clip against side planes. FIGS. 3A-3B also depicts a view plane 320, onto which a three-dimensional scene in world space is projected through screen space transformations computed during rendering. The view plane 320 corresponds to a two-dimensional plane defining the screen space onto which the graphics are rendered for presentation on a display. According to one aspect, the view direction may be defined by the view plane normal 329, which may be analogous to the direction from which the scene is viewed from the center of projection 316. While the view plane 320 is illustrated as lying within the view volume 314 in FIGS. 3A-3B, it may be understood to lie anywhere in the scene with an orientation parallel to the near 310 and far clipping planes 312, and the principles of transforming the scene from world space to screen space would be the same.

The window of the view plane 320 lying within the viewing volume 314, i.e., rectangular window 322, defines the screen space for which the graphics are rendered. This window 322 corresponds to the "viewing window" or "viewport" of the scene, which is made up of a plurality of screen space pixels. One or more objects 318 which lie within the view volume would be projected to the screen space viewing window 322, while objects or portions of objects, e.g., triangle primitives of the object, which are outside the viewing volume, e.g., object 319, would be clipped out of view, i.e., before each transformed object is scan converted during rasterization for further per-pixel processing.

Homogeneous coordinates are used for the view plane 320 and screen space viewing window 322, the concept of which is more clearly illustrated in FIG. 3B by the projection lines 324. The projection lines 324 in FIG. 3B also more clearly illustration why the location of the viewing plane 320 does not matter, and can be conceptually understood to be within the frustum or outside of it. The homogeneous coordinates of the vertices of the object 318 linearly correspond to the screen space 322 locations of those vertices as viewed from the viewer's intended viewpoint 316. The transformation between world space and the homogeneous coordinate space for a given view consists of a linear matrix transform to align the view direction with the Z axis and viewport orientation with the X and Y coordinate axes, followed by a divide of X and Y coordinates by Z, often called the "perspective divide".

In the conventional example depicted in FIGS. 3A-3C, the parameters of the rendering are the same throughout the entire area of screen space 322. For example, among other things, the frustum is the same, the clipping planes are all the same, and the view direction and homogeneous coordinate space of the screen 322 are all the same. If the conventional example depicted in FIGS. 3A-3C were used for stereoscopic image, it would be possible to have two distinct sets of views for the same scene depicted in FIGS. 3A-3C, corresponding to left and right eye views with each eye located at a different center of projection 316. Distinct left and right eye images could be rendered in this case, but the rendering parameters would still be identical across the entire area of screen space output image for each left eye and right eye image.

Figure 4A:
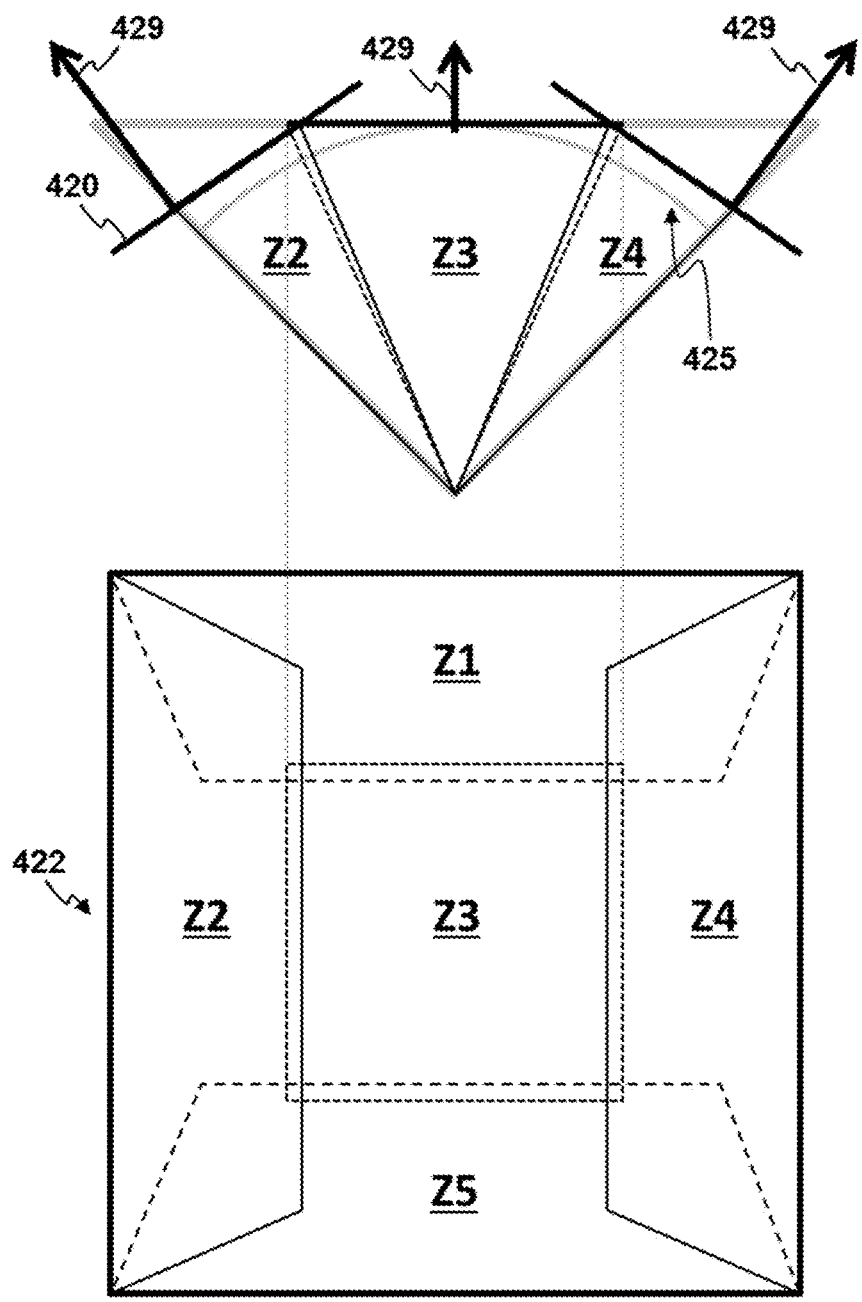
FIGS. 4A-4C are schematic diagrams depicting rendering parameters for screen spaces having a plurality of zones, with the zones having different sets of rendering parameters in accordance with aspects of the present disclosure.
Figure 4B:
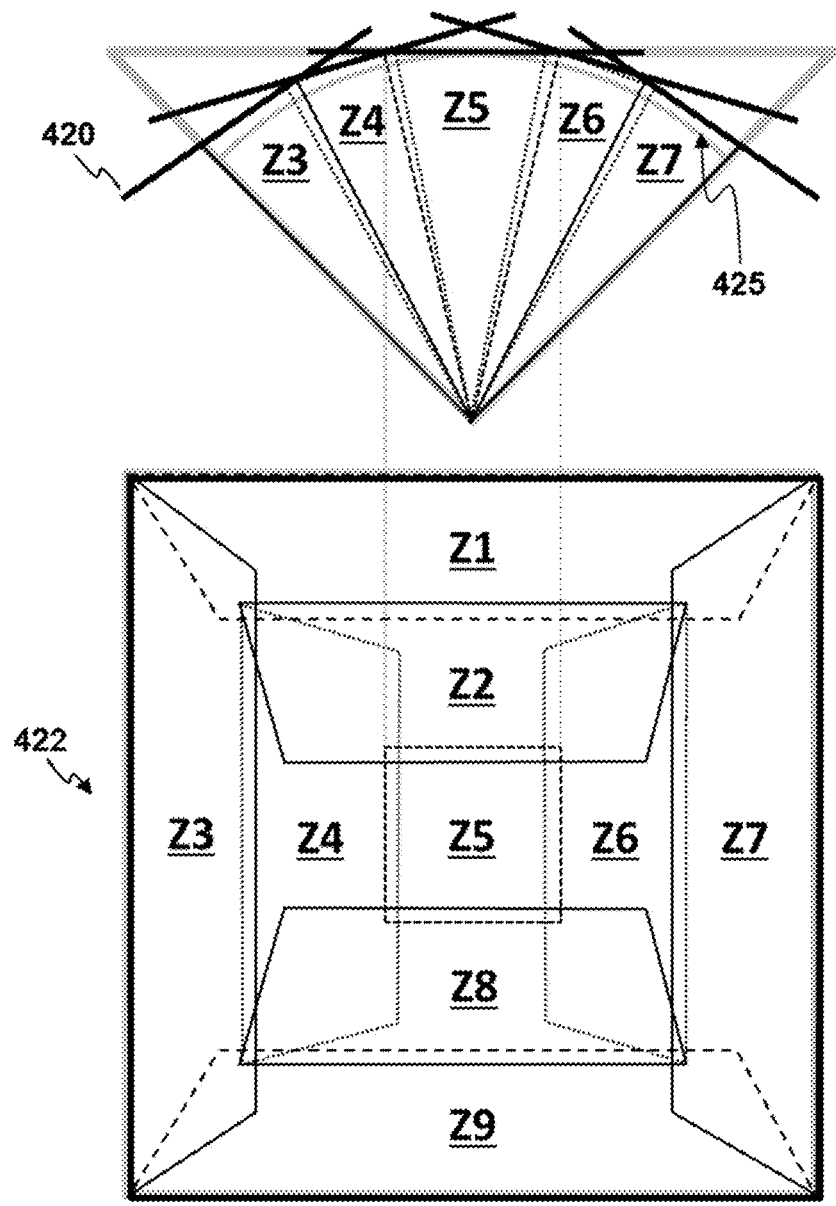

Turning now to FIGS. 4A-4B, two illustrative examples of the present disclosure are depicted. In the illustrated examples, the screen space area, which corresponds to the output image(s), is divided into distinct zones (i.e., Z1, Z2, Z3, etc.), and each zone of the screen is rendered using different parameters.

With reference to the principles described earlier with respect to FIGS. 1A-1C, in certain implementations it would be advantageous if the screen space 422 were rendered as if it weren't flat, e.g., for the illustrated display systems 425 (shown in the figure with a curved screen) which may correspond to wide FOV displays, such as for HMDs. FIG. 4B is similar to the example depicted in FIG. 4A, but its screen space 420 is divided into a greater number of zones Z. In each of the illustrated examples, each zone Z may be rendered using the same view position but a different view direction 429 (e.g., a different view plane normal as shown in the figure) and corresponding different respective viewports, with the collection of all zone viewports chosen to collectively minimize the variance of solid angle per pixel and to cover the entire field of view with a minimum of overlap between zones or projection beyond the full field of view. Each zone may be rasterized to a separate render target (or a separate set of multiple render targets), and the resulting images may be composited back together to produce a single wide FOV display image as a post-processing step. This approximates transforming objects within the scene to a "screen" 422 that is not flat.

Figure 4C:
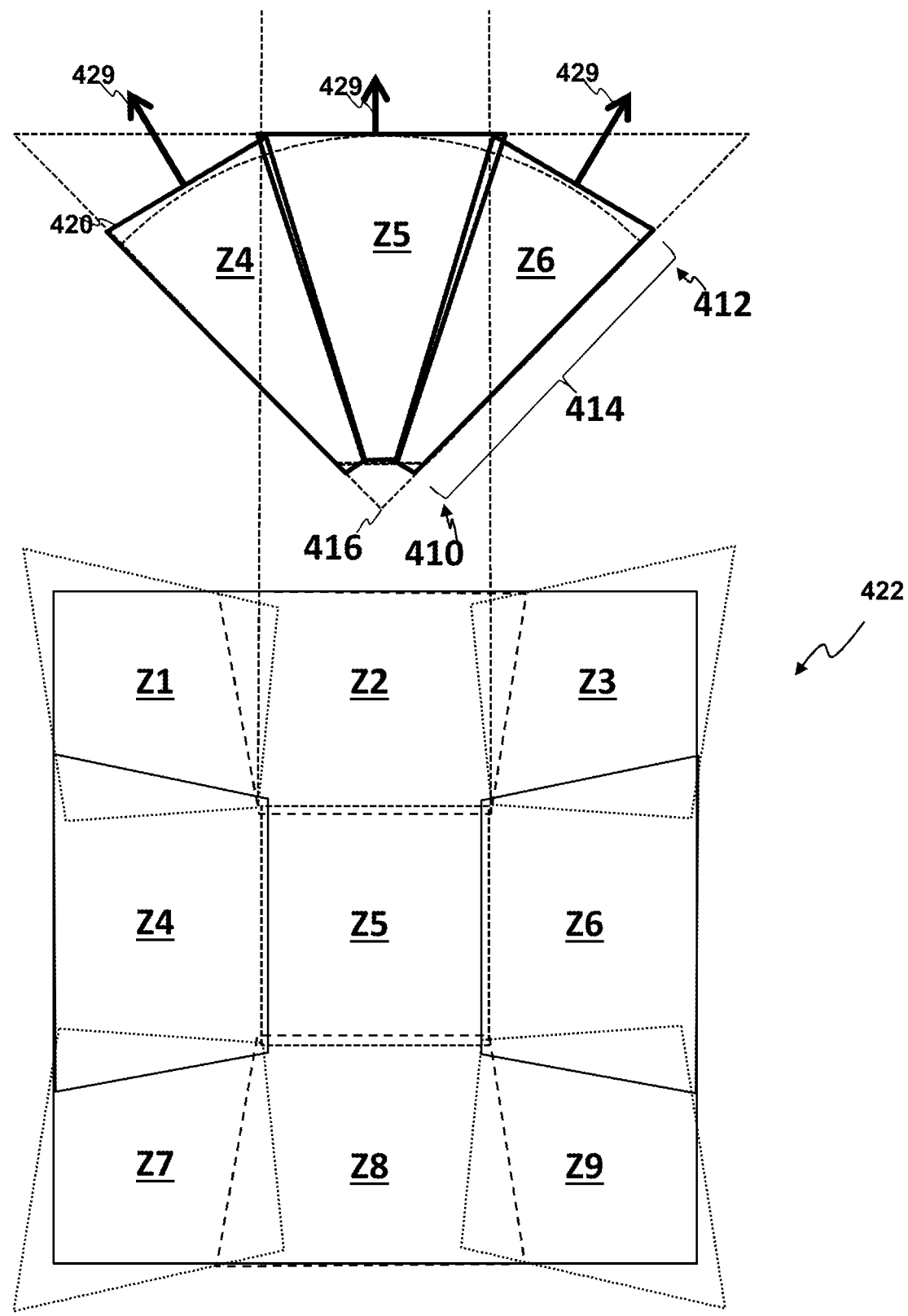

As shown in FIG. 4C, point 416 indicates the common view point of all illustrated zone frusta. Lines 410 and 412 correspond to the near clipping planes and far clipping planes, respectively, for zone Z6 which define a viewing volume 414 for objects in zone Z6. Similar respective viewing volumes and near/far clipping planes can be seen in the figure for zones Z4 and Z5 for their respective view frustra. Each zone has a different view direction 429 and so a different homogeneous coordinate space, but, because all share a common view point 416, there is a simple projective transformation between the view plane of each zone frustum and the full field of view plane 422. After rendering the scene to a separate screen space image for each zone, it is thus possible to apply a projective transform on each zone's image of the scene in order to composite a single full field of view output image as a final step before displaying the output. With reference to FIGS. 1-2 above, the benefit may be appreciated by considering a scan conversion process that utilizes raster tiles with a particular size. For off center zones, the same scene geometry may be projected to a plane having a smaller pixel area while still maintaining a target minimum pixel density in angular space. Thus the total pixel area rendered is reduced, which translates into a corresponding decrease in pixel shading and hardware pixel processing overhead, and a corresponding increase in rendering efficiency without meaningful loss in output quality.

Figure 5A:
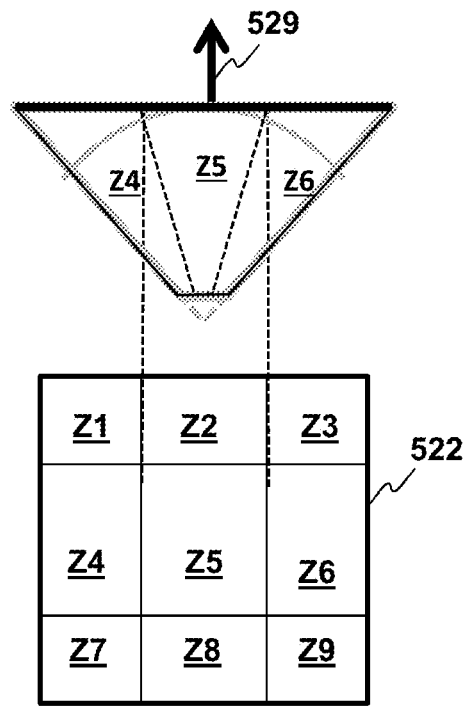
FIG. 5A-5B are schematic diagrams depicting rendering parameters for screen spaces having a plurality of zones, with the zones having different sets of rendering parameters in accordance with aspects of the present disclosure.
Figure 5B:
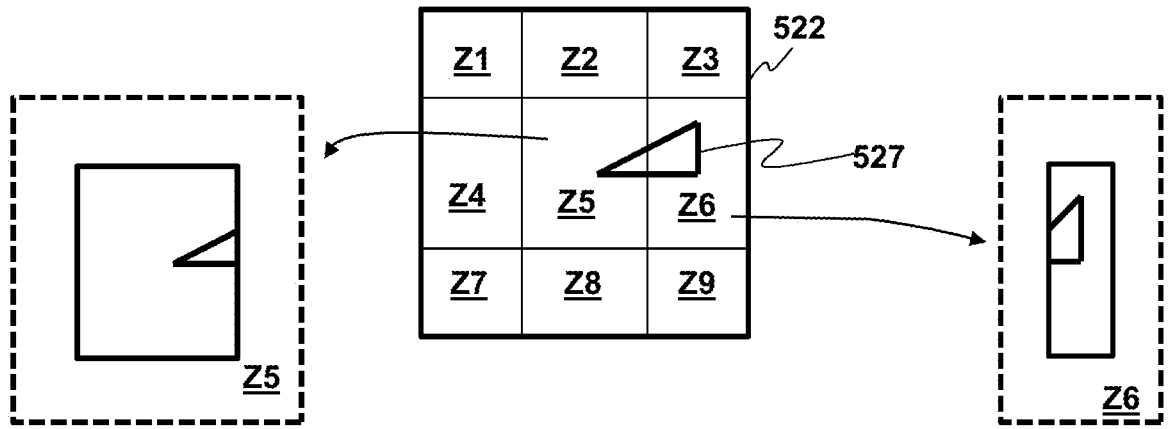

Turning now to FIGS. 5A and 5B, another illustrative example of the present disclosure is depicted, which utilizes different rendering parameters in different zones. FIGS. 5A and 5B depict an image of the screen space 522 used to project the scene geometry. In this illustrative example, the screen space is divided into 9 zones (Z1, Z2, etc.), and the different zones of the screen space 522 may be computed with the same homogeneous coordinates and the same view frustum, but with different linear transformations from homogeneous coordinates to screen space pixels. During scene rendering, tests against planes defined by the view point and zone boundaries may be used to discard rendering of objects or primitives to zones which they do not intersect. While the splits between zones may be used to generate planes used to determine which zones a given primitive needs to render to, in this case, different screen space transform parameters are used to "intercept" the primitives as they reach the point of being rasterized into pixel coordinates, and there apply different scales in each zone to change the pixel density in that zone. In this example, view direction 529 of each zone is the same, e.g., as seen for the different zones Z4, Z5, and Z6 of FIG. 5A, but screen space transforms are computed to "intercept" the vertices in world space geometry before they reach the view plane 522, e.g., to approximate rendering to a "screen" that is not flat To better illustrate this, FIG. 5B also depicts an illustrative example of a primitive 527 in the world geometry, and, more specifically a triangle primitive. In this example, the triangle 527 overlaps two different zones in the screen space, i.e., zones Z5 and Z6. FIG. 5B also depicts how the triangle 527 is transformed from homogeneous coordinates to screen space pixel coordinates differently for the different zones, due to the different zones having different screen space transform parameters. Note the horizontal "squash" in zone Z6. In this example, the rendering parameters may be selected for one or more edge zones, e.g., zones Z2, Z4, Z6, and Z8 that "squash" primitives in a given screen space area along one screen axis (e.g., squashed along the horizontal x-axis of the screen for zones Z4 and Z6, or the vertical y-axis of the screen for zones Z2 and Z8). Furthermore, different zones may be selected to further squash the geometry along both screen axes for one or more of the corner zones, (e.g., squash along both horizontal and vertical axes for zones Z1, Z3, Z7, and Z9). For off center zones, the same scene geometry is rendered to a smaller pixel area while still maintaining a target minimum pixel density in angular space. Thus the total pixel area rendered is reduced, which translates into a corresponding decrease in pixel shading and hardware pixel processing overhead, and a corresponding increase in rendering efficiency without meaningful loss in output quality.

The difference between the rendering parameters of FIGS. 4A-4C and FIGS. 5A-5B can be understood with reference to the overall process of converting scene geometry to a screen space.

In the example of FIGS. 4A-4C, vertex positions of the scene may be computed using different homogeneous coordinate spaces, which correspond to different view directions. In certain implementations, these vertex positions in the different homogeneous coordinate spaces may be output from a vertex shader. Then, screen space transform parameters may be used for each zone to project the vertices from homogenous coordinate space to screen space (which may, e.g., project the scene geometry onto the view plane). This is analogous to projecting the primitive vertices to different viewports corresponding to different view directions.

In the example of FIGS. 5A-5B, the vertex positions of primitives may be computed using the same homogeneous coordinate spaces in each zone, corresponding to the same view direction, and it becomes possible to output the positions of the primitive vertices in a single shared homogeneous coordinate space from a vertex shader. Then, during primitive assembly, the primitives may be transformed from homogeneous coordinate space to screen space pixels for rasterization, but this may utilize different screen space transform parameters for each zone. Although it is possible to output the positions of the primitive vertices in a single shared homogeneous coordinate space from a vertex shader it is not required to do so and it may or may not be desirable based on other considerations. For example, if hardware exists to enable the reuse of a single vertex shading between all output zones, sharing the same homogeneous coordinate space would be required for a single vertex shading to be applicable to all zones. But if no such hardware exists, existing triangle culling hardware would cull zone boundaries only if each zone has a different homogenous space, so sharing the same space would introduce the need for culling at internal zone boundaries to be handled by some other means.

In some implementations, zone indices per-primitive might be embedded in the vertex index data defining the primitive connectivity of the object mesh or might be supplied as a separate buffer.

In some implementations, the vertex index data and zone indices supplied to the GPU might additionally be culled by the writer to only include zone indices per primitive which that primitive might cover.

In some implementations, the vertex index data and zone indices supplied to the GPU might further be culled to remove primitives for which it can be determined that the primitive assembly unit would cull that primitive in hardware.

In some implementations, per primitive zone indices and possibly culled vertex index data might be supplied to the GPU by the CPU or by a compute shader running on the GPU.

Figure 6:
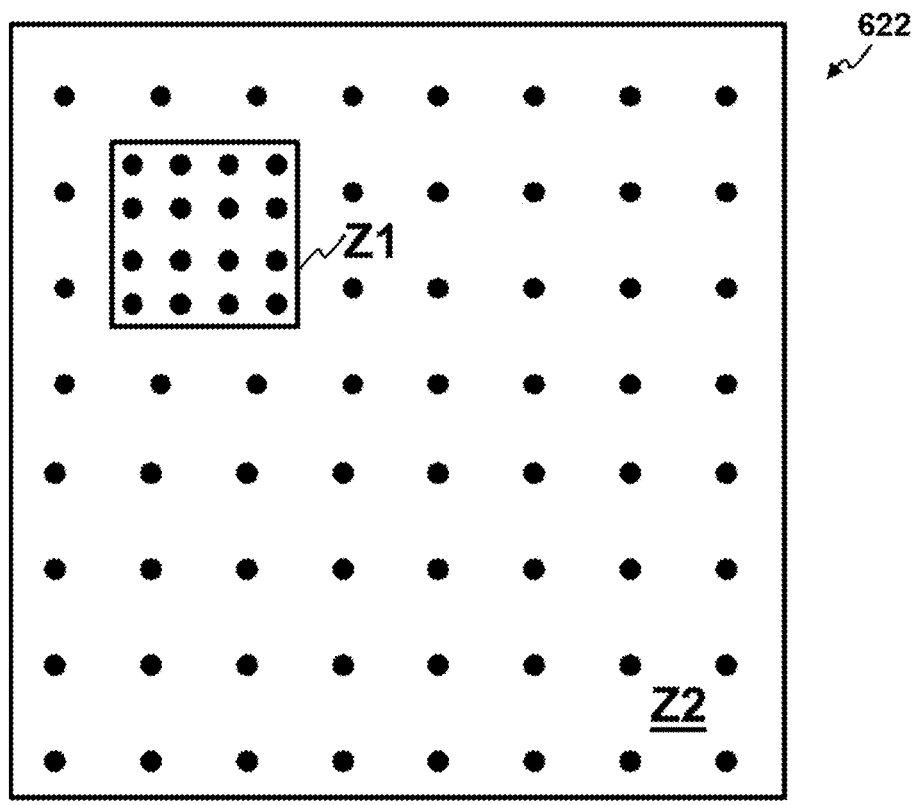
FIG. 6 is a schematic diagram depicting rendering parameters for a screen space having a plurality of zones, with the zones having different sets of rendering parameters in accordance with aspects of the present disclosure.

Turning now to FIG. 6, another illustrative example of the present disclosure is depicted that utilizes different rendering parameters for different zones in screen space 622. In this example, two different zones are depicted: zone Z1, which may, e.g., correspond to a center of screen space, or a fixation point in screen space for foveated rendering, or both, and zone Z2, which may correspond to an edge and border region of screen space, or outside of a fixation point for foveated rendering, or both. In this example, the same homogeneous coordinate space and view direction is used across zones, as well as the same frustums and screen space transform parameters. However, in this example the different zones (different areas of the screen) may have, for example, different pixel densities, sample densities different pixel formats, some combination thereof, or potentially other different rendering parameters that may result in different fidelities for the different zones. For example, in this example, zone Z2 may be determined to be less important than zone Z1 in terms of how graphics rendering resources should be allocated. Accordingly, zone Z2 may be rendered using a lower pixel density or otherwise lower fidelity rendering parameters. During scene rendering, tests against planes defined by the view point and zone boundaries may be used to discard rendering of objects or primitives to zones which they do not intersect.

It is noted that, in accordance with aspects of the present disclosure, different zones may differ in more than one rendering parameter, i.e., different zones differ in two or more rendering parameters, and it is possible for different zones to differ in any combination of rendering parameters described herein. For example, different zones may differ in any combination of the rendering parameters described above. Moreover, in certain implementations, it is possible for different zones to differ in other rendering parameters beyond or instead of those parameters described above with reference to FIGS. 4-6. For example, according to certain aspects, different zones may utilize different pixel formats from each other. According to additional aspects, different multiple render target (MRT) parameters may be used in the different zones. By way of example, and not by way of limitation, one zone may support fewer multiple render targets per render target location, as compared to another zone in order to preserve rendering resources for the other zones.

Figure 7C:
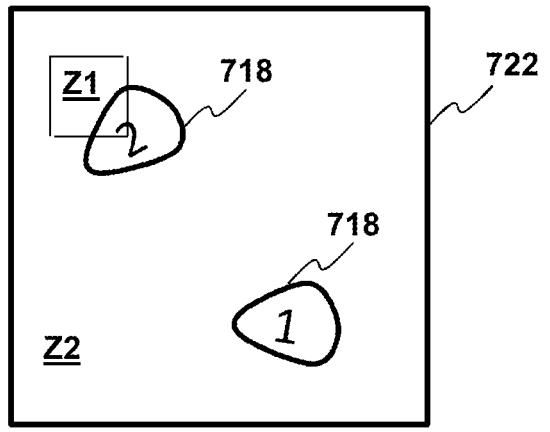

It is noted that, in certain instances, an object in a scene may overlap or "cover" a plurality of zones in a single frame when its geometry is rendered as an output image for a screen. As a consequence, in certain implementations it may be necessary to re-render the same object at one or more stages in the pipeline using the different rendering parameters of the different zones that it overlaps. FIGS. 7A-7C illustrate screen space viewing windows 722 that each include a plurality of different zones with different rendering parameters. In each of the examples, at least one of the objects 718 in the images overlaps a plurality of zones (Z1, Z2, etc.), and the number over each object in the illustration of FIGS. 7A-7C corresponds to the number of distinct zones that the object covers in the illustrated examples.

In the illustrated implementation of FIG. 7A, zone Z1 may correspond to a fixation point for a user's gaze, while the zone Z2 may correspond to a peripheral zone outside the fixation point that may be rendered with one or more different rendering parameters to preserve the rendering resources for the fixation point Z1 where the viewer's visual acuity it the greatest. In certain implementations, the fixation point for zone Z1 may be determined dynamically in real-time from an eye gaze tracking system, meaning that it is possible for the location of the zones Z1 and Z2 on the screen to change dynamically over time, e.g., change over different frames, as a viewer changes his gaze direction, and the graphics may be rendered in real-time in response to the detected changes. In the example depicted in FIG. 7A, zone Z1 may be a high resolution area that may have a unique MRT, frustum, screen space transform, and pixel format, while the homogeneous coordinates of the screen may be the same for the different zones. Note that the object overlapping zone Z1 may need to be replayed twice before pixel processing, corresponding to the number of different zones that the object overlaps.

FIG. 7B depicts another illustrative implementation of the present disclosure. In the example depicted in FIG. 7B, the zones may have unique MRT, screen space transforms, and pixel formats. In this example, the zones may have the same homogeneous coordinates and may share frustums. It should be noted that, if the zones are laid out in a similar manner to the example depicted in FIG. 7B, it is possible for the left and right edge zones, e.g., Z4 and Z6, and possibly the top and bottom edge zones, e.g., Z2 and Z8, to have the same rendering parameters as each other, which may be different from the other zones. Likewise, it is possible for the corner zones, e.g., Z1, Z3, Z7, and Z9 to have the same rendering parameters as each other, which may be different from the other zones. Stated another way, each zone may be considered to be a distinct section of the screen image having a unique set of rendering parameters, and in certain implementations, the screen image may be divided so that corner regions of the viewport corresponding to the locations of Z1, Z3, Z7, and Z9 belong to the same zone, and similarly, edge regions corresponding to Z4 and Z6 or Z2 and Z8 belong to the same zone. This may be true if, for example, the only different rendering parameter of the different zones is pixel format or sample density. If, however, different view directions are used, they are different zones. In certain implementations, the parameters of the zones may be chosen in accordance with the principles described above, e.g., with respect to FIGS. 1-2, based on a determined relative importance of the pixels.

FIG. 7C depicts another illustrative implementation of the present disclosure. In this example, the different zones may have the vertex positions defined to unique homogeneous coordinate spaces for the different zones, and may also use different frustums and screen space transforms, while they may share MRT and pixel formats. It is noted that the illustrated implementations of FIGS. 7A-7C are by way of example, and it is possible to modify or combine the zone layouts and the rendering parameter differences of the zones in a number of different ways in accordance with aspects of the present disclosure.

In certain implementations, an efficient graphics rendering process may need to render the entire object uniquely at one or more stages of the rendering pipeline, meaning that the number over the objects 718 in the illustrated examples of FIGS. 7A-7C corresponds to the number of times that the object needs to be rendered. More specifically, in certain implementations, such as those where the parameters of the screen space transformations are different and/or the homogeneous coordinate spaces are different for the different zones in a manner similar to that described above, the object may need to be processed uniquely for each zone that it overlaps before it can be scan converted at the screen space pixels and fragments are generated for further per pixel processing. Accordingly, aspects of the present disclosure include systems and methods for efficient re-rendering of an object before a pixel processing stage in the graphics pipeline is reached.

Generally, before a draw call is issued for any given object, certain input data needs to be set up, e.g., via a command buffer, which typically may include registers set up for rendering parameters, such as the frustum's parameters, MRT, and the like. For objects which are covered by more than one zone, this means that the object needs data to be set up with the parameters from each of the zones that it overlaps. As rendering is performed for a portion of the object falling within one zone or the other, a new context may need to be used for the different respective rendering parameters. Since vertex shading computations are generally performed over each vertex on what is essentially an object-by-object basis, meaning the particular zone and corresponding rendering parameter may change from vertex to vertex for an object based on the different zones, this may become inefficient for objects with vertices in multiple zones, e.g., vertices falling in different zones of the screen area.

Figure 8:
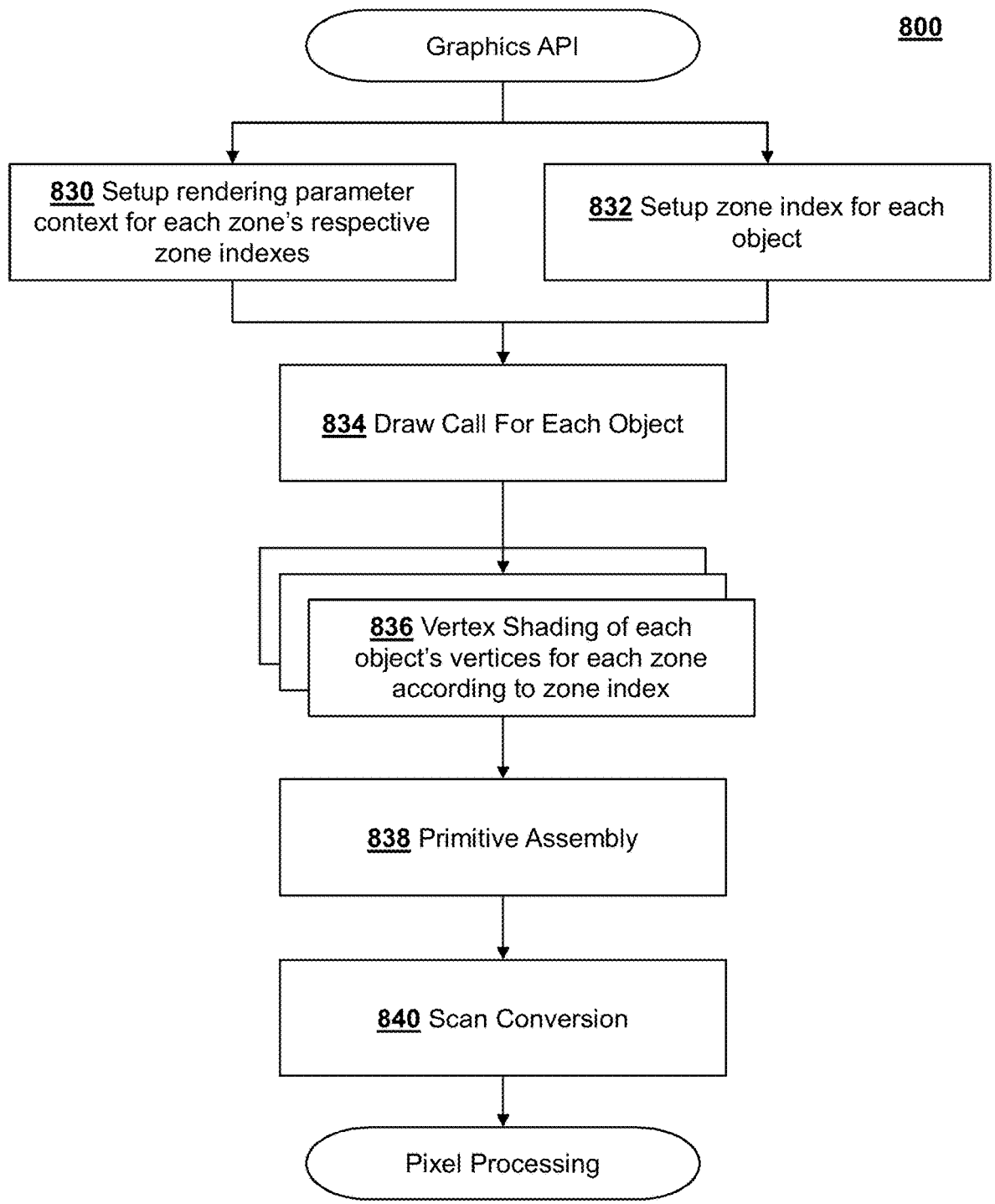
FIG. 8 is a flow chart depicting a method of re-rendering an object covered by multiple zones in screen space in accordance with aspects of the present disclosure.

Accordingly, FIG. 8 depicts an illustrative implementation of rendering to different zones in screen space efficiently via the command buffer. As shown in FIG. 8, prior to a draw call for an object, each different set of rendering parameters may be set up in memory and associated with its respective zone via a zone index, as indicated at 830. This may optionally include setting up the set of rendering parameters in registers for each distinct zone, and indexing each of these registers with a zone index. The rendering parameter context set up at 830 may include all frustum, MRT, and other rendering parameters.

As indicated at 832, prior to a draw call for each object, each zone that the object overlaps may be determined and set up for the object, e.g., by the application. This may include, for each object, setting up the zone indices for the object for each zone that the object covers in the screen area. The zone index may be associated with the appropriate rendering parameter context for the zone of the screen area that was set up at 830.

This avoids large overhead associated with context switching for vertex shading operations at different vertices of the object that may correspond to different ones of the zones, since frequent changes between the different contexts of the different zone rendering parameters would make the rendering inefficient. Instead, only the zone index context may be switched, as different vertices of the same object in different zones of the screen are shaded during vertex processing. This may significantly improve efficiency when rendering different portions of a screen with different rendering parameters, since the zone index may be essentially only a single number and correspond to a much smaller set of data then the entire context of the rendering parameters.

Figure 7C:
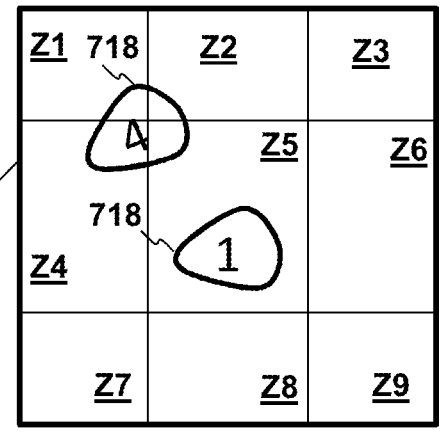
Figure 7C:
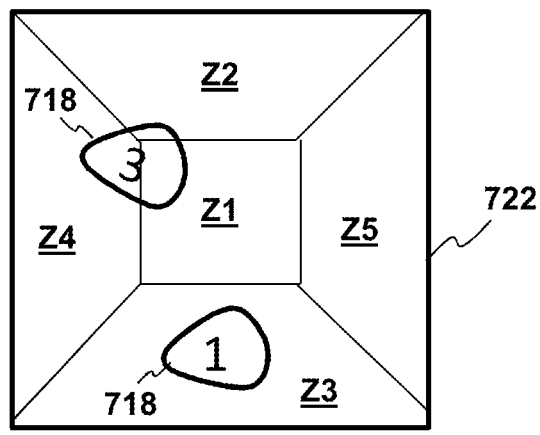

As shown in FIG. 8, a draw call may be issued for each of the objects 834, e.g., each object in a frame. Setting up the zone indices/contexts and issuing the draw call may be implemented via a graphics API, and the method 800 may include vertex shading computations 836 for the vertices of the objects, in accordance with the draw call 834. In this illustrated implementation, each vertex of the object may be shaded with the parameters of each zone indicated in its zone indices set up at 832. Stated another way, the object may be re-rendered at this stage for each zone that the object overlaps, e.g., in accordance with the numbers depicted in the examples of FIG. 7. Thus, for an object covering two zones of the screen with two different respective sets of rendering parameters, a number of vertex shader invocations may be doubled as the vertex shader processes each vertex of the object with the unique set of rendering parameters for each zone. In the implementation depicted in FIG. 8, since an object may be re-rendered for different zones of screen space in the vertex shader, according to the associated zone indices, it is possible to utilize different homogeneous coordinate spaces for different zones of the screen. The vertex shader may then output the positions of the vertices of the object with unique homogeneous coordinates for each zone.

After all vertices have been shaded for a given object, e.g., via manipulation of various parameter values such as texture coordinates, lighting values, colors, and the like, the objects' vertices and parameters may pass to primitive assembly 838, where vertices of the objects defining the primitives, e.g., triangles, may be mapped to a screen space viewing window (sometimes known as a "viewport") through various operations that compute projections and coordinate space transformations, as well as clip primitives to a view frustum in accordance with the rendering parameters of the different zones. The output of the primitive assembly unit may be passed to a rasterizer for scan conversion into discrete pixels in the screen space, as indicated at 840. In the illustrated implementation, it is possible for different zones in screen space to have different parameters for the primitive assembly operations 838, such as different clip planes, viewing frustums, screen space transformation parameters, and the like, depending on the rendering parameters of the different zones set up at 830.

After each primitive has been rasterized, associated fragments and pixel values may be further processed in later pixel processing stages of a rendering pipeline before the final frame is generated for display.

Figure 9A:
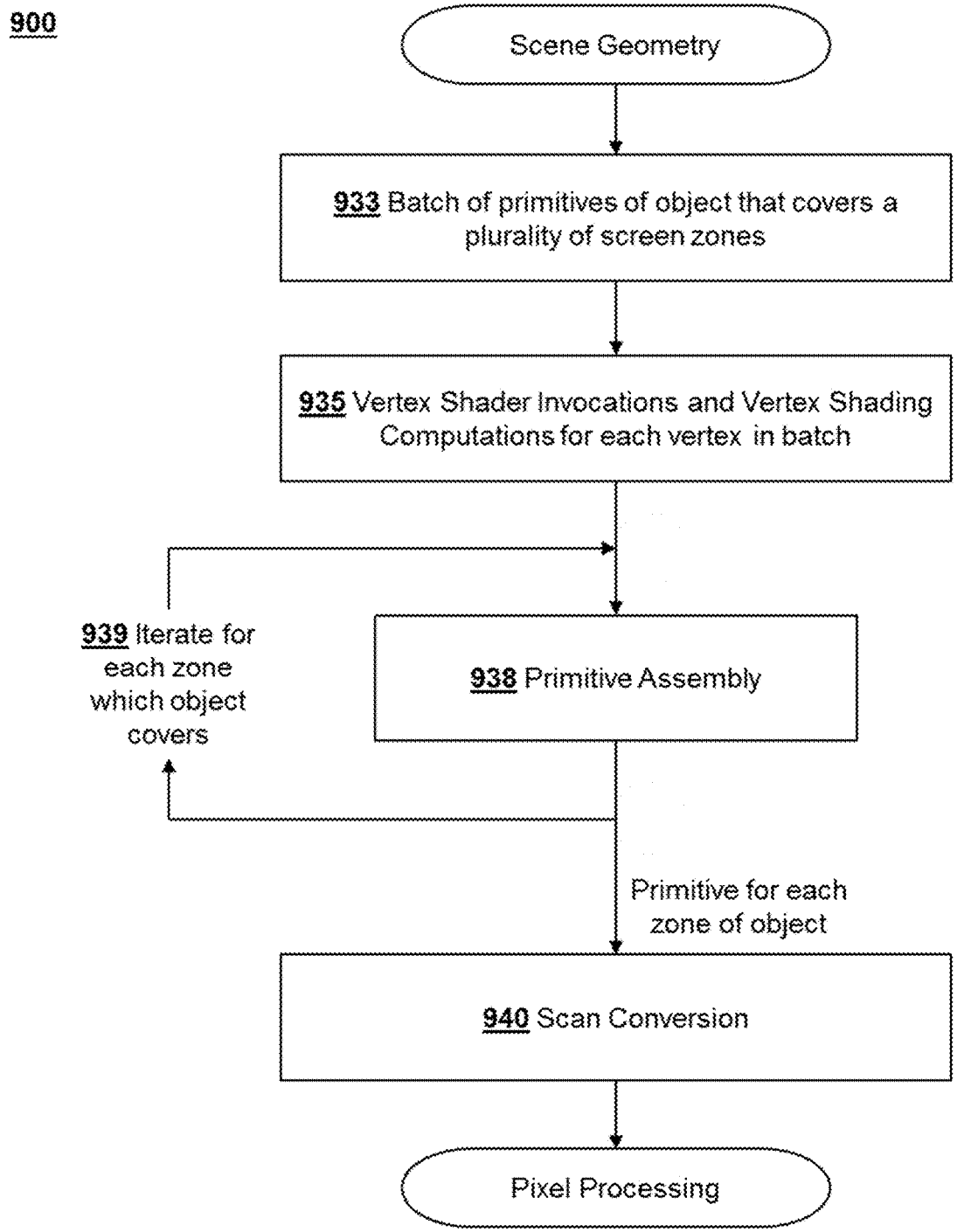
FIGS. 9A-9B are flow charts depicting another method of re-rendering an object covered by multiple zones in screen space in accordance with aspects of the present disclosure.

Turning now to FIG. 9A, another method 900 is depicted in accordance with additional aspects of the present disclosure. Generally speaking, in the illustrative method 900 depicted in FIG. 9A, for an object that overlaps a plurality of zones, primitives of the object are received. For each received primitive, a new primitive may be assembled for each zone in screen space that the object overlaps, according to the rendering parameters of each zone. Stated another way, for an object overlapping a plurality of zones, each of its primitives may be re-assembled for each of the different zones, which may include different parameters during primitive assembly, such as different viewing frustums, different clip planes, different screen space transformations, and the like.

As indicated at 933, a batch of primitives may belong to an object. As shown at 935, a vertex shader may be invoked and vertex shading computations may be performed for each vertex in the batch. In this example, the vertex shader does not need to be invoked uniquely for each zone that the object overlaps, and, as such, the vertex shader overhead is not increased relative to conventional methods. Rather, in this implementation, it is possible to first apply the different rendering parameters later, during primitive assembly.

As indicated at 938, a primitive assembler may assemble primitives to screen space for rasterization from the batches of primitives received. In this example, the primitive assembly may run iteratively over each zone of the screen that the object covers, as shown at 939. Accordingly, it may re-assemble each primitive in a batch of primitives of an object according to the number of zones, with unique primitive assembly rendering parameters for each zone the object of the primitive overlaps. As indicated at 940, each of the resulting primitives may then be scan converted to its target zone's screen space for further pixel processing.

There are a number of ways to supply the zone indices per object for the case in which iteration over zones is provided by the primitive assembly unit. By way of example, and not by way of limitation, the zone indices may be supplied as an array in graphics memory. The array, e.g., may be embedded in the command buffer or accessed via a pointer in the command buffer. The zone indices per object might be supplied to the GPU through such a buffer by a CPU or by a compute shader running on the GPU.

Figure 9B:
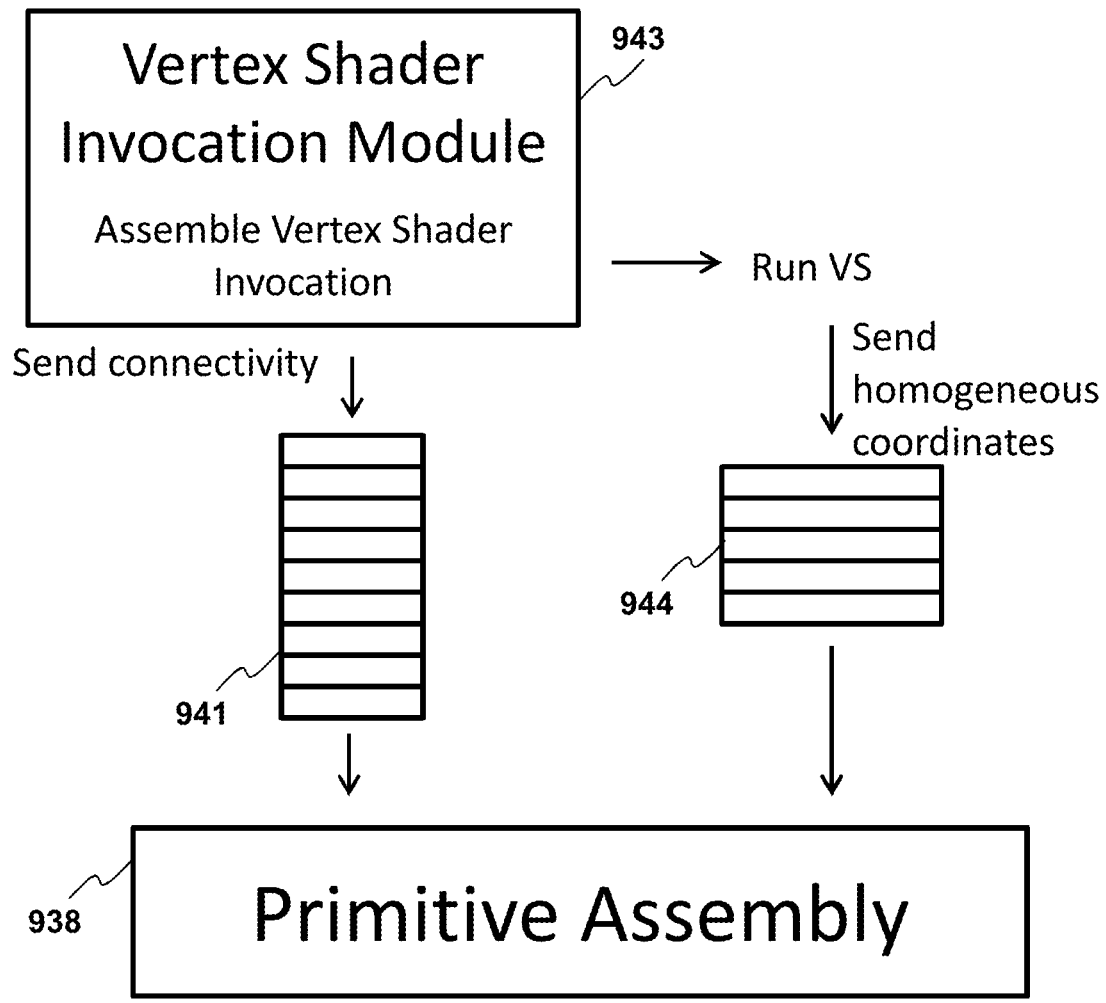

FIG. 9B is a schematic diagram depicting additional aspects of a method in accordance with the method of FIG. 9A. The example process depicted in FIG. 9B may utilize a FIFO buffer (first input, first output) 941 to hold iterations of primitives as a primitive assembly (PA) unit 938 re-assembles primitives iteratively over each zone that its corresponding object overlaps The example depicted in FIG. 9B includes a vertex shader invocation module 943 which may be configured to invoke a vertex shader to process the parameters of vertices of objects in a scene. Concurrently, connectivity data associated with those vertices may be sent to the primitive buffer 941, which contains information as to how primitives are comprised from groups of vertices, and also contains information regarding the zones to which each primitive should be rendered.

A vertex shader may perform vertex shader computations to manipulate various parameters of the vertices, and the positions of the vertices may be defined in homogeneous coordinates by the vertex shader and output from the vertex shader to a position cache 944. The primitive assembler 938 may receive the batches of primitives from the primitive buffer and run iteratively for each indicated zone, i.e., each zone that the object containing the primitive overlaps. The resulting pixels may then be sent to a scan converter (not shown) for further pixel processing.

A benefit to the implementation of FIGS. 9A-9B, as compared to the implementation depicted in FIG. 8, is that the vertex shader overhead may not be increased for objects overlapping different zones, since the different vertex positions in different homogeneous coordinate spaces may not be needed for the different primitive assembly operations for each zone. However, it may be difficult to utilize zones with different view directions using only the technique depicted in FIGS. 9A-9B, since the vertex shader typically is configured to compute the homogeneous coordinates of the vertices.

In certain implementations, however, it is possible to use a combination of the techniques depicted in FIG. 8 and FIGS. 9A-9B.

Figure 10A:
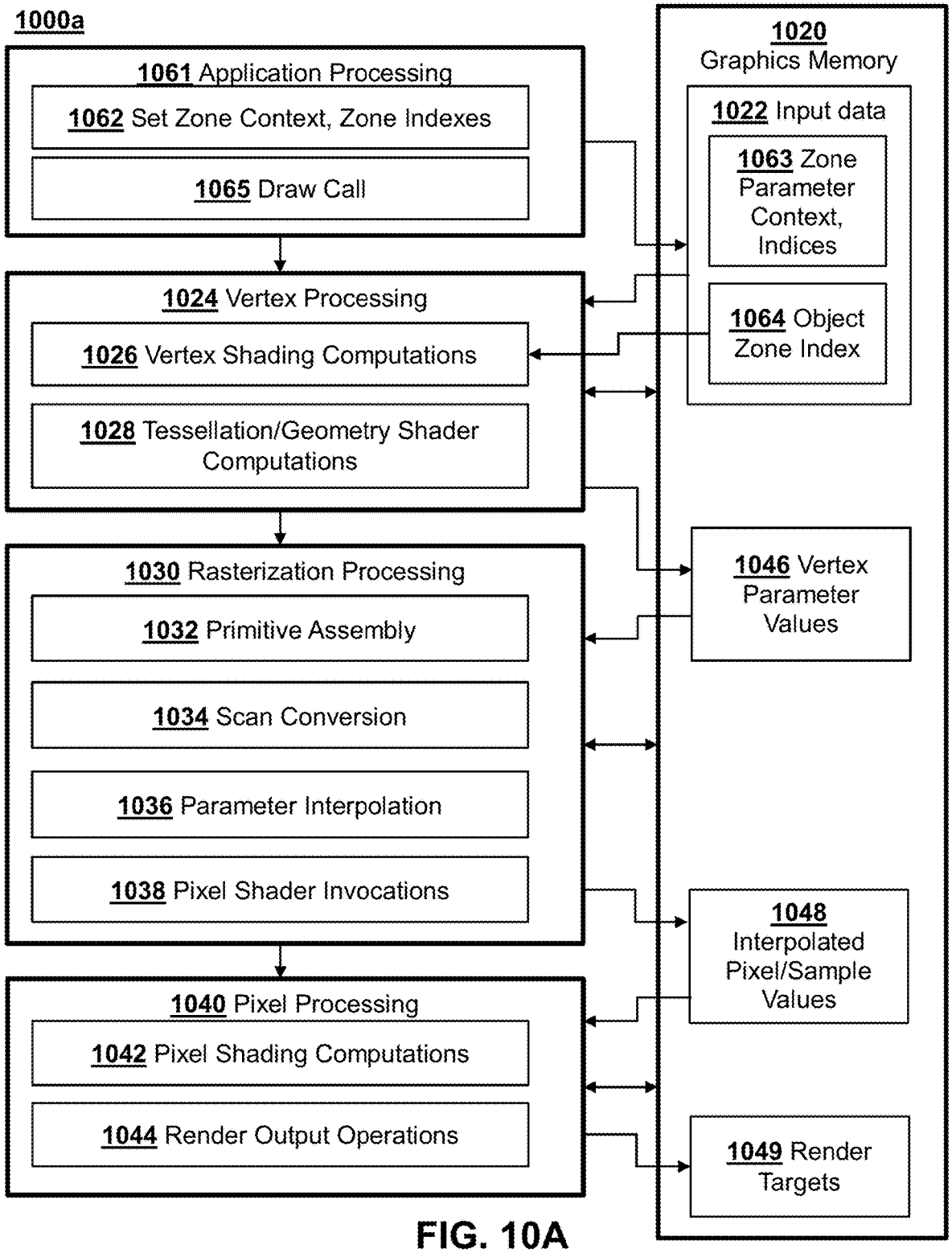
FIGS. 10A-10B are flow diagrams depicting graphics rendering pipelines according to aspects of the present disclosure.

FIG. 10A depicts an illustrative graphics rendering pipeline 1000a configured to implement aspects of the present disclosure. The illustrative rendering pipeline depicted in FIG. 10A may incorporate the method 800 of FIG. 8 in order to render objects to a screen having a plurality of different zones with different rendering parameters.

The rendering pipeline 1000a may be configured to render graphics as images that depict a scene which may have a preferably three-dimensional geometry in virtual space (sometimes referred to herein as "world space"), but potentially a two-dimensional geometry. Throughout the rendering pipeline, data may be read from and written to one or more memory units, which are generally denoted in the figure as graphics memory 1020. The graphics memory may contain video memory and/or hardware state memory, including various buffers and/or graphics resources utilized in the rendering pipeline. One or more individual memory units of the graphics memory 1020 may be embodied as one or more video random access memory unit(s), one or more caches, one or more processor registers, etc., depending on the nature of data at the particular stage in rendering. Accordingly, it is understood that graphics memory 1020 refers to any processor accessible memory utilized in the graphics rendering pipeline. A processing unit, such as a specialized GPU, may be configured to perform various operations in the pipeline and read/write to the graphics memory 1020 accordingly.

The early stages of the pipeline may include operations performed in world space before the scene is rasterized and converted to screen space as a set of discrete picture elements suitable for output on the pixel display device. Throughout the pipeline, various resources contained in the graphics memory 1020 may be utilized at the pipeline stages and inputs and outputs to the stages may be temporarily stored in buffers contained in the graphics memory before the final values of the images are determined.

The initial stages of the pipeline may include an application processing stage 1061, which may set up certain input data 1022 for the various rendering stages in the pipeline. The application processing stage 1061 may include setting up rendering parameter contexts 1063 for each zone of a screen area, as indicated at 1062, along with a respective zone index assigned to each unique zone context, e.g., a zone index associated with each unique draw context containing the rendering parameter data. The application processing stage 1061 may also set up each object for rendering, e.g., as a polygon mesh defined by a set of vertices in virtual space, and set up the zone index 1064 for each unique zone of screen space that the object covers. As indicated at 1065, a draw call may then be issued for each object so that it may be rendered according to the rendering parameters of one or more zones that it covers. In certain implementations, the process 1000a may be coordinated between a distinct CPU and GPU.

The input data 1022 may be accessed and utilized to implement various rendering operations to render the object according to one or more rendering parameters, depending on its zone indices 1064 and the corresponding rendering context 1063 associated with those indices. The rendering pipeline may operate on input data 1022, which may include one or more virtual objects defined by a set of vertices that are set up in world space and have geometry that is defined with respect to coordinates in the scene. The input data 1022 utilized in the rendering pipeline 1000a may include a polygon mesh model of the scene geometry whose vertices correspond to the primitives processed in the rendering pipeline in accordance with aspects of the present disclosure, and the initial vertex geometry may be set up in the graphics memory during an application stage implemented by a CPU. The early stages of the pipeline may include what is broadly categorized as a vertex processing stage 1024 in the figure and this may include various computations to process the vertices of the objects in world space geometry. This may include vertex shading computations 1026, which may manipulate various parameter values of the vertices in the scene, such as position values (e.g., X-Y coordinate and Z-depth values), color values, lighting values, texture coordinates, and the like. Preferably, the vertex shading computations 1026 are performed by one or more programmable vertex shaders. The vertex shading computations may be performed uniquely for each zone that an object overlaps, and the object zone index 1064 may be utilized during vertex shading 1026 to determine which rendering context and the associated parameters that the object uses, and, accordingly, how the vertex values should be manipulated for later rasterization.

The vertex processing stage may also optionally include additional vertex processing computations, such as tessellation and geometry shader computations 1028, which may be used to subdivide primitives and generate new vertices and new geometries in world space. Once the stage referred to as vertex processing 1024 is complete, at this stage in the pipeline the scene is defined by a set of vertices which each have a set of vertex parameter values 1046, which may be stored in the graphics memory. In certain implementations, the vertex parameter values 1046 output from the vertex shader may include positions defined with different homogeneous coordinates for different zones, according to the object's zone index 1064.

The pipeline 1000a may then proceed to rasterization processing stages 1030 associated with converting the scene geometry into screen space and a set of discrete picture elements, i.e., pixels used during the rendering pipeline, although it is noted that the term pixel does not necessarily mean that the pixel corresponds to a display pixel value in the final display buffer image. The virtual space geometry may be transformed to screen space geometry through operations that may essentially compute the projection of the objects and vertices from world space to the viewing window (or "viewport") of the scene that is made up of a plurality of discrete screen space pixels sampled by the rasterizer. In accordance with aspects of the present disclosure, the screen area may include a plurality of distinct zones with different rendering parameters, which may include different rasterization parameters for the different zones. The rasterization processing stage 1030 depicted in the figure may include primitive assembly operations 1032, which may set up the primitives defined by each set of vertices in the scene. Each vertex may be defined by a vertex index, and each primitive may be defined with respect to these vertex indices, which may be stored in index buffers in the graphics memory 1020. The primitives should include at least triangles that are defined by three vertices each, but may also include point primitives, line primitives, and other polygonal shapes. During the primitive assembly stage 1032, certain primitives may optionally be culled. For example, those primitives whose vertex indices and homogeneous coordinate space positions indicate a certain winding order may be considered to be back-facing and may be culled from the scene. Primitive assembly 1032 may also include screen space transformations for the primitive vertices, which may optionally include different screen space transform parameters for different zones of the screen area.

After primitives are assembled, the rasterization processing stages may include scan conversion operations 1034, which may sample the primitives at each discrete pixel and generate fragments from the primitives for further processing when the samples are covered by the primitive. In some implementations of the present disclosure, scan conversion 1034 may determine sample coverage for a plurality of samples within each screen space pixel.

The fragments (or "pixels") generated from the primitives during scan conversion 1034 may have parameter values that may be interpolated to the locations of the pixels from the vertex parameter values 1046 of the vertices of the primitive that created them. The rasterization stage 1030 may include parameter interpolation operations 1036 to compute these interpolated fragment parameter values 1048, which may be used as inputs for further processing at the later stages of the pipeline, and parameter interpolation may also include interpolation of depth values from the vertex depth values of the primitives covering the depth samples, which may or may not be used as input fragment values to the pixel shader, depending on the configuration.

The method 1000a may include further pixel processing operations, indicated generally at 1040 in the figure, to further manipulate the interpolated parameter values 1048, as well as perform further operations determining how the fragments and/or interpolated values contribute to the final pixel values for display. Some of these pixel processing tasks may include pixel shading computations 1042 that may be used to further manipulate the interpolated parameter values 1048 of the fragments. The pixel shading computations may be performed by a programmable pixel shader, and pixel shader invocations 1038 may be initiated based on the sampling of the primitives during the rasterization processing stages 1030.

The pixel shading computations 1042 may output values to one or more buffers in graphics memory 1020, sometimes referred to as render targets 1049. In some implementations, multiple render targets (MRTs) may be used, in which case the pixel shader may be able to output multiple independent values for each per-pixel or per-sample output. In certain implementations of the present disclosure, it is possible to use different MRT parameters for different zones of the screen. The pixel processing 1040 may include render output operations 1044, which may include what are sometimes known as raster operations (ROP). Render output operations 1044 may include depth tests, stencil tests, and/or other operations in order to determine whether fragment values processed by the pixel shader, and possibly interpolated depth values not processed by the pixel shader, should be written to a color buffer and/or depth buffer, and some of the render output operations may be performed after the pixel shading computations 1042 or before the pixel shading computations 1042 as an optimization. The final color values and depth values per sample in the render targets 1049 may be determined in accordance with the render output operations 1044, which may be stored as one or more back buffers to the display buffer (sometimes known as a "frame buffer") before the final display pixel values which make up the finished frame are determined.

The finished frame may be from the results of a plurality of different draw calls in accordance with the pipeline operations described above. Moreover, implementations of the present disclosure may also composite different screen space images computed with different rendering parameters into an output display image having a plurality of different zones. Optionally, additional post-processing may be used to hide seams between zones of the output display image, which may optionally occur, for example, after the pixel processing from a plurality of different draw calls.

It is also noted that any stages of the pipeline may be implemented in hardware modules, software modules (e.g., one or more individual or unified shader programs), or some combination thereof.

Figure 10B:
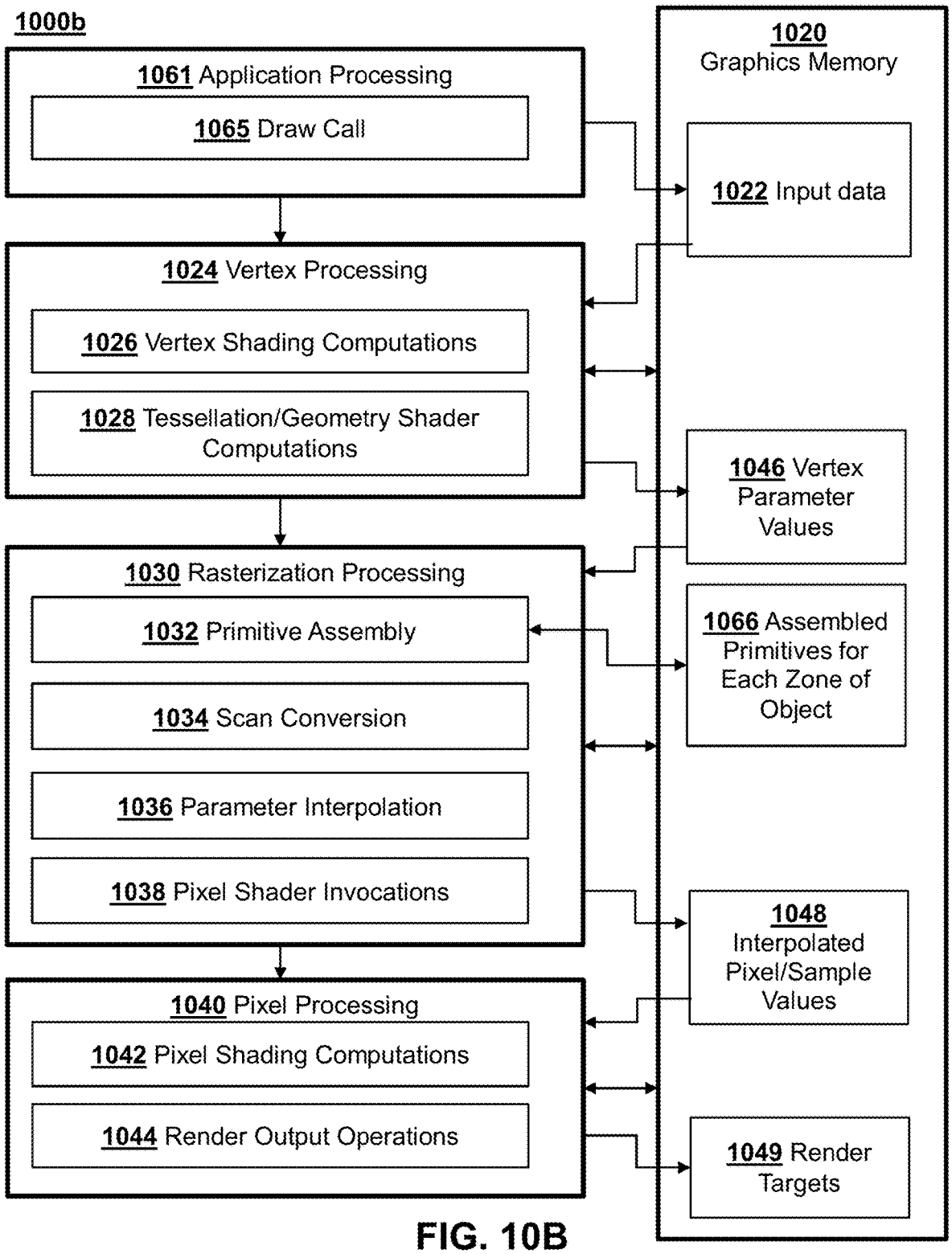

Turning now to FIG. 10B, another illustrative example is depicted. In the implementation depicted in FIG. 10B, the rendering method 1000b may be configured to implement aspects of the re-rendering method depicted in FIG. 9. In this example, the method 1000b may include many features in common with the example depicted in FIG. 10A. However, in this example, the primitive assembler at 1032 may be configured to iteratively map each primitive to a viewport for each zone covered by its corresponding object, in accordance with the example depicted in FIG. 9, which may result in batches of assembled primitives 1066 uniquely assembled to each different screen space zone for an object covering different zones.

Figure 11:
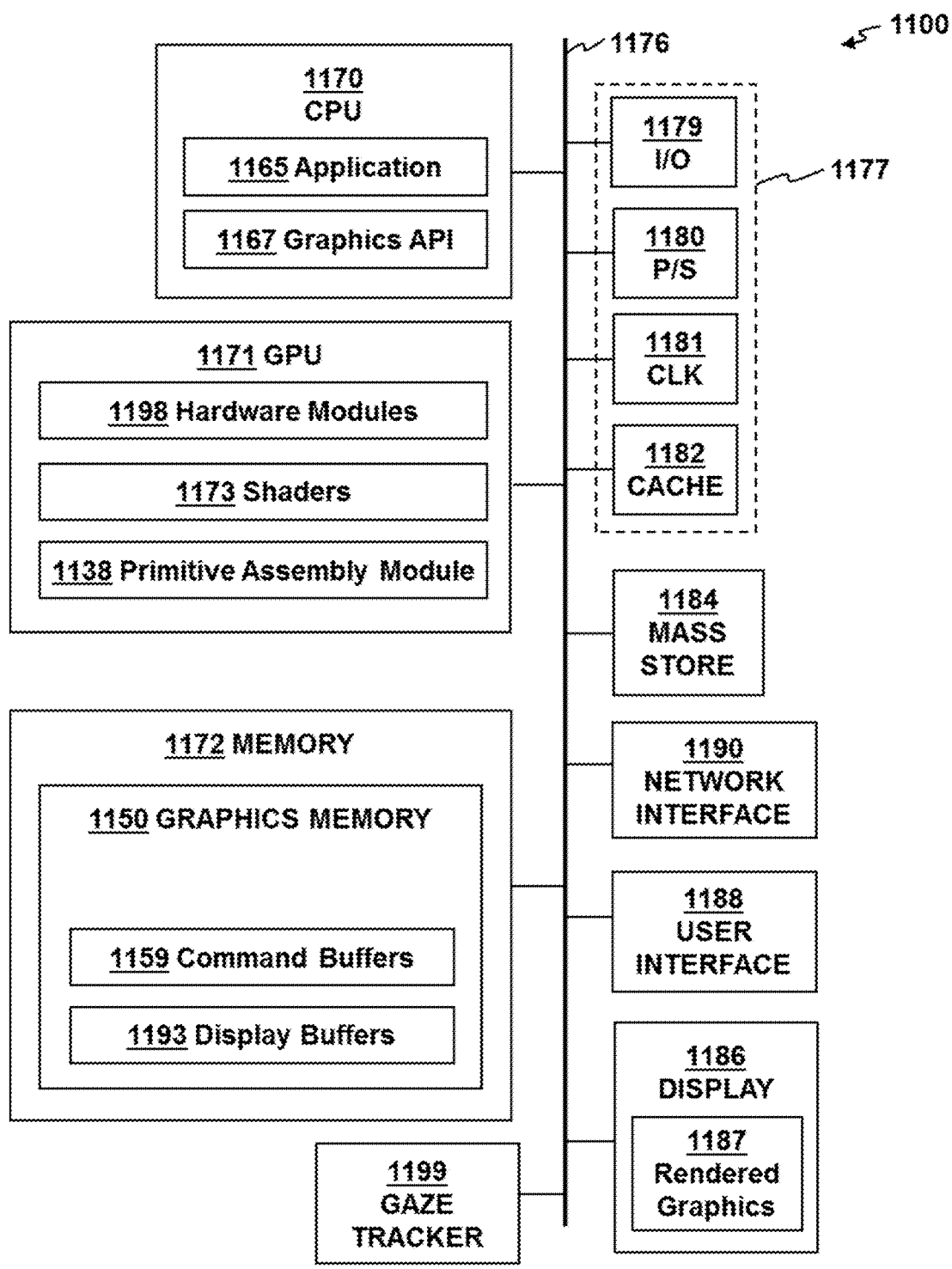
FIG. 11 is a schematic diagram depicting a graphics rendering system according to aspects of the present disclosure.

Turning now to FIG. 11, an illustrative example of a computing system 1100 that is configured to render graphics in accordance with aspects of the present disclosure is depicted. The system 1100 may be configured to render graphics for an application 1165 in accordance with aspects described above. According to aspects of the present disclosure, the system 1100 may be an embedded system, mobile phone, personal computer, tablet computer, portable game device, workstation, game console, and the like.

The system may generally include a processor and a memory configured to implement aspects of the present disclosure, e.g., by performing a method having features in common with the methods of FIGS. 8 and/or 9. In the illustrated example, the processor includes a central processing unit (CPU) 1170, a graphics processing unit (GPU) 1171, and a memory 1172. The memory 1172 may optionally include a main memory unit that is accessible to both the CPU and GPU, and portions of the main memory may optionally include portions of the graphics memory 1150. The CPU 1170 and GPU 1171 may each include one or more processor cores, e.g., a single core, two cores, four cores, eight cores, or more. The CPU 1170 and GPU 1171 may be configured to access one or more memory units using a data bus 1176, and, in some implementations, it may be useful for the system 1100 to include two or more different buses.

The memory 1172 may include one or more memory units in the form of integrated circuits that provides addressable memory, e.g., RAM, DRAM, and the like. The graphics memory 1150 may temporarily store graphics resources, graphics buffers, and other graphics data for a graphics rendering pipeline. The graphics buffers may include command buffers 1159 configured to hold rendering context data and zone indices in accordance with aspects of the present disclosure. The graphics buffers may also include, e.g., one or more vertex buffers for storing vertex parameter values and one or more index buffers for storing vertex indices. The graphics buffers may also include one or more render targets, which may include both color buffers and depth buffers holding pixel/sample values computed according to aspects of the present disclosure. The values in the buffers may correspond to pixels rendered using different rendering parameters corresponding to different zones of a screen in accordance with aspects of the present disclosure. In certain implementations, the GPU 1171 may be configured to scanout graphics frames from a display buffer 1193 for presentation on a display 1186, which may include an output display image having a plurality of different zones in accordance with aspects of the present disclosure.

The CPU may be configured to execute CPU code, which may include an application 1165 utilizing rendered graphics (such as a video game) and a corresponding graphics API 1167 for issuing draw commands or draw calls to programs implemented by the GPU 1171 based on the state of the application 1165. The CPU code may also implement physics simulations and other functions.

The GPU may be configured to operate as discussed above with respect to illustrative implementations of the present disclosure. To support the rendering of graphics, the GPU may execute shaders 1173, which may include vertex shaders and pixel shaders. The GPU may also execute other shader programs, such as, e.g., geometry shaders, tessellation shaders, compute shaders, and the like. The GPU may also include specialized hardware modules 1198, which may include one or more texture mapping units and/or other hardware modules configured to implement operations at one or more stages of a graphics pipeline similar to the pipeline depicted in FIGS. 10A-10B, which may be fixed function operations. The shaders 1173 and hardware modules 1198 may interface with data in the memory 1150 and the buffers at various stages in the pipeline before the final pixel values are output to a display. The shaders 1173 and/or other programs configured to be executed by the processor of the system 1100 to implement aspects of the graphics processing techniques described herein may be stored as instructions in a non-transitory computer readable medium. The GPU may include a primitive assembly module 1138, which may be optionally embodied in a hardware module 1198 of the GPU, a shader 1173, or a combination thereof.

The primitive assembly module 1138 may be configured to iterate received primitives over a plurality of different zones in screen space, in accordance with aspects of the present disclosure.

The system 1100 may also include well-known support functions 1177, which may communicate with other components of the system, e.g., via the bus 1176. Such support functions may include, but are not limited to, input/output (I/O) elements 1179, power supplies (P/S) 1180, a clock (CLK) 1181, and a cache 1182. The apparatus 1100 may optionally include a mass storage device 1184 such as a disk drive, CD-ROM drive, flash memory, tape drive, Blu-ray drive, or the like to store programs and/or data. The device 1100 may also include a display unit 1186 to present rendered graphics 1187 to a user and user interface unit 1188 to facilitate interaction between the apparatus 1100 and a user. The display unit 1186 may be in the form of a flat panel display, cathode ray tube (CRT) screen, touch screen, or other device that can display text, numerals, graphical symbols, or images. The display 1186 may display rendered graphics 1187 processed in accordance with various techniques described herein. In certain implementations, the display device 1186 may be a head-mounted display (HMD) or other large FOV display, and the system 1100 may be configured to optimize rendering efficiency for the large FOV display. The user interface 1188 may be one or more peripherals, such as a keyboard, mouse, joystick, light pen, game controller, touch screen, and/or other device that may be used in conjunction with a graphical user interface (GUI). In certain implementations, the state of the application 1165 and the underlying content of the graphics may be determined at least in part by user input through the user interface 1188, e.g., in video gaming implementations where the application 1165 includes a video game. The system 1100 may also include an eye gaze tracker 1199 which may be configured to detect a viewer's fixation point on a display, e.g., to implement foveated rendering, and the system 1100 may be configured to adjust the location of one or more zones on a viewport in response. The eye gaze tracking unit 1199 may include one or more light sources, such as infrared LEDs or other infrared light sources, and one or more cameras, such as infrared cameras, in order to detect a fixation point on a screen based on a user's eye gaze direction detected from the cameras.

The system 1100 may also include a network interface 1190 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

Additional Aspects

Additional aspects of the present disclosure include a method of processing graphics depicting one or more objects as mapped to a screen area, the screen area including a plurality of zones, each said zone having a different set of rendering parameters, the method comprising: setting up a rendering parameter context for each said zone in memory; assigning each said zone a zone index; setting up an object in the memory, wherein the object covers at least two of the zones of the screen area, wherein the at least two zones are assigned to at least two of the zone indices, respectively, and wherein said setting up the object includes setting up the at least two zone indices for the object; and issuing a draw call for the object.

Another additional aspect is a computer-readable medium having computer executable instructions embodied therein that, when executed, implement the foregoing method.

A further aspect is an electromagnetic or other signal carrying computer-readable instructions for performing the foregoing method.

Yet another aspect is a computer program downloadable from a communication network and/or stored on a computer-readable and/or microprocessor-executable medium, characterized in that it comprises program code instructions for implementing the foregoing method.

Additional aspects of the present disclosure include a method of processing graphics depicting one or more objects as mapped to a screen area, the screen area including a plurality of zones, each said zone having a different set of rendering parameters, the method comprising: receiving a batch of primitives belonging to an object covering at least two of the zones of the screen area;

assembling each of the primitives to screen space with a primitive assembler, wherein said assembling each of the primitives includes iterating each primitive with the primitive assembler at least two times (once for each of the at least two zones), using the different set of rendering parameters of the respective zone with each iteration.

Another additional aspect is a computer-readable medium having computer executable instructions embodied therein that, when executed, implement the foregoing method.

A further aspect is an electromagnetic or other signal carrying computer-readable instructions for performing the foregoing method.

Yet another aspect is a computer program downloadable from a communication network and/or stored on a computer-readable and/or microprocessor-executable medium, characterized in that it comprises program code instructions for implementing the foregoing method.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method of processing graphics depicting one or more objects as mapped to a screen area, the screen area including a plurality of zones, each said zone having a different set of rendering parameters, the method comprising:

assembling each primitive of a batch of primitives belonging to an object covering at least two of the zones of the screen area to a screen space, wherein said assembling each of the primitives includes iterating each primitive with a primitive assembler for each of the zones covered by the object, wherein each said zone is associated with a different set of screen space transform parameters used to transform locations of vertices in the batch of primitives from a homogenous coordinate space to a head mounted display screen space that is not flat before scan conversion and wherein the plurality of zones are arranged to minimize an overlap between zones.

2. The method of claim 1, wherein each said different set of rendering parameters includes a different view direction, such that each said zone has a different view direction defined by a different homogeneous coordinate space.

3. The method of claim 1, wherein each zone is rendered using a different view direction from a same view position and all zones are arranged to collectively minimize variance in an amount of the field of view from the view position that a pixel covers.

4. The method of claim 1, wherein each said different set of rendering parameters includes a different pixel format, such that each said zone has a different pixel format.

5. The method of claim 1, wherein each said different set of rendering parameters includes a different pixel density, such that each said zone has a different pixel density.

6. The method of claim 1, wherein each said different set of rendering parameters includes a different sample density, such that each said zone has a different sample density.

7. The method of claim 1, wherein the plurality of zones include a center zone and at least one edge zone, wherein the rendering parameters of the edge zone are selected to preserve graphics rendering resources for the center zone.

8. The method of claim 1, wherein the plurality of zones include a fixation point zone determined from an eye gaze tracker and at least one peripheral zone, wherein the rendering parameters of the peripheral zone are selected to preserve graphics rendering resources for the fixation point zone.

9. The method of claim 1, wherein zone indices per-primitive are embedded in vertex index data defining primitive connectivity of an object mesh or are supplied as a separate buffer.

10. The method of claim 1, wherein vertex index data and zone indices for each particular primitive of the batch of primitives supplied to a GPU are culled to only include zone indices per primitive which the particular primitive might cover.

11. The method of claim 1, wherein per primitive zone indices or culled vertex index data for the batch of primitives are supplied to a GPU by a CPU or by a compute shader running on the GPU.

12. A system comprising:
a processor, and
a memory coupled to the processor,
wherein the processor is configured to perform a method of processing graphics depicting one or more objects as mapped to a screen area, the screen area including a plurality of zones, each said zone having a different set of rendering parameters, the method comprising:
assembling each primitive of a batch of primitives belonging to an object covering at least two of the zones of the screen area to a screen space, wherein said assembling each of the primitives includes iterating each primitive with a primitive assembler for each of the zones covered by the object, wherein each said zone is associated with a different set of screen space transform parameters used to transform locations of vertices in the batch of primitives from a homogenous coordinate head mounted display space to a screen space that is not flat before scan conversion and wherein the plurality of zones are arranged to minimize an overlap between zones.

13. The system of claim 12, further comprising a large FOV display device.

14. The system of claim 12, wherein the plurality of zones include a center zone and at least one edge zone, wherein the rendering parameters of the edge zone are selected to preserve graphics rendering resources for the center zone.

15. The system of claim 12, further comprising an eye gaze tracker.

16. The system of claim 15, wherein the plurality of zones include a fixation point zone determined from the eye gaze tracker, and wherein the plurality of zones include at least one peripheral zone, wherein the rendering parameters of the peripheral zone are selected to preserve graphics rendering resources for the fixation point zone.

17. The system of claim 12, wherein each said different set of rendering parameters includes a different view direction, such that each said zone has a different view direction defined by a different homogeneous coordinate space.

18. The system of claim 12, wherein each zone is rendered using a different view direction from a same view position and all zones are arranged to collectively minimize variance in an amount of the field of view from the view position that a pixel covers.

19. The system of claim 12, wherein each said different set of rendering parameters includes a different pixel format, such that each said zone has a different pixel format.

20. The system of claim 12, wherein each said different set of rendering parameters includes a different pixel density, such that each said zone has a different pixel density.

21. The system of claim 12, wherein each said different set of rendering parameters includes a different sample density, such that each said zone has a different sample density.

22. The system of claim 12, wherein the plurality of zones include a center zone and at least one edge zone, wherein the rendering parameters of the edge zone are selected to preserve graphics rendering resources for the center zone.

23. The system of claim 12, wherein the plurality of zones include a fixation point zone determined from an eye gaze tracker and at least one peripheral zone, wherein the rendering parameters of the peripheral zone are selected to preserve graphics rendering resources for the fixation point zone.

24. A non-transitory computer readable medium having processor-executable instructions embodied therein, wherein execution of the instructions by a processor causes the processor to implement a method of processing graphics depicting one or more objects as mapped to a screen area, the screen area including a plurality of zones, each said zone having a different set of rendering parameters, the method comprising:
assembling each primitive of a batch of primitives belonging to an object covering at least two of the zones of the screen area to a screen space, wherein said assembling each of the primitives includes iterating each primitive with the primitive assembler for each of the zones covered by the object, wherein each said zone is associated with a different set of screen space transform parameters used to transform locations of vertices in the batch of primitives from a homogenous coordinate space to a screen space that is not flat before scan conversion and wherein the plurality of zones are arranged to minimize an overlap between zones.

25. The non-transitory computer readable medium of claim 24, wherein each said different set of rendering parameters includes a different view direction, such that each said zone has a different view direction defined by a different homogeneous coordinate space.

26. The non-transitory computer readable medium of claim 24, wherein each zone is rendered using a different view direction from a same view position and all zones are arranged to collectively minimize variance in an amount of the field of view from the view position that a pixel covers.

27. The non-transitory computer readable medium of claim 24, wherein each said different set of rendering parameters includes a different pixel format, such that each said zone has a different pixel format.

28. The non-transitory computer readable medium of claim 24, wherein each said different set of rendering parameters includes a different pixel density, such that each said zone has a different pixel density.

29. The non-transitory computer readable medium of claim 24, wherein each said different set of rendering parameters includes a different sample density, such that each said zone has a different sample density.

30. The non-transitory computer readable medium of claim 24, wherein the plurality of zones include a center zone and at least one edge zone, wherein the rendering parameters of the edge zone are selected to preserve graphics rendering resources for the center zone.

31. The non-transitory computer readable medium of claim 24, wherein the plurality of zones include a fixation point zone determined from an eye gaze tracker and at least one peripheral zone, wherein the rendering parameters of the peripheral zone are selected to preserve graphics rendering resources for the fixation point zone.

\* \* \* \* \*